US012744584B2

(12) United States Patent
Patel et al.

(10) Patent No.: US 12,744,584 B2
(45) Date of Patent: Sep. 22, 2026

(54) MANAGEMENT OF CONNECTION REQUESTS BASED ON SERVICES LOADED ON SATELLITES

(71) Applicant: International Business Machines Corporation, Armonk, NY (US)

(72) Inventors: Kushal S. Patel, Pune (IN); Gandhi Sivakumar, Mountain View, CA (US); Sarvesh S. Patel, Pune (IN)

(73) Assignee: International Business machines Corporation, Armonk, NY (US)

( * ) Notice: Subject to any disclaimer, the term of this patent is extended or adjusted under 35 U.S.C. 154(b) by 402 days.

(21) Appl. No.: 18/385,305

(22) Filed: Oct. 30, 2023

(65) Prior Publication Data

US 2025/0141534 A1 May 1, 2025

(51) Int. Cl.
*H04B 7/185* (2006.01)

(52) U.S. Cl.
CPC ................................ *H04B 7/18513* (2013.01)

(58) Field of Classification Search
CPC ............ H04B 7/18513; H04B 7/18541; H04B 7/18521; H04B 7/18532; H04B 7/18539; H04B 7/18545; H04B 7/18558; H04B 7/18567; H04B 7/185; H04B 7/18523; H04B 7/18526; H04B 7/18534; H04W 84/06; H04W 36/00837; H04W 36/083
See application file for complete search history.

(56) References Cited

U.S. PATENT DOCUMENTS 6,104,911 A * 8/2000 Diekelman ........ H04B 7/18534 455/12.1
2017/0105153 A1 4/2017 Ashrafi et al.
2019/0288771 A1 * 9/2019 Metzger ............. H04B 7/18513
2020/0322844 A1 10/2020 Tatum
(Continued)

OTHER PUBLICATIONS

Anonymous, "Method and Apparatus for Enhanced Connectivity Using Proactive Connection Handler Spawning in LEO Satellites," IP.com Prior Art Database, Technical Disclosure No. IPCOM000272721D, Jul. 21, 2023, 7 pages.
(Continued)

*Primary Examiner* — Lester G Kincaid
(74) *Attorney, Agent, or Firm* — Jeffrey Ingalls

(57) ABSTRACT

A computer-implemented method, according to one embodiment, includes receiving, on a first satellite, a first connection request, and analyzing the first connection request to determine services needed to fulfill the first connection request. In response to a determination that the first satellite does not have at least a predetermined number of the determined services loaded, a predetermined offload process is performed. Performing the predetermined offload process includes identifying at least one satellite having a footprint coverage region that simultaneously matches a footprint coverage region of the first satellite within a first area of Earth's surface, determining whether a first of the identified satellites has at least the predetermined number of the determined services loaded, and causing the first connection request to be offloaded to the first identified satellite in
(Continued)

response to a determination that the first identified satellite has at least the predetermined number of the determined services loaded.

20 Claims, 11 Drawing Sheets

(56) References Cited

U.S. PATENT DOCUMENTS

| | | | | |
|---|---|---|---|---|
| 2023/0156826 A1* | 5/2023 | Palermo | H04W 28/0268 | 370/329 |
| 2023/0164089 A1* | 5/2023 | Greene | H04B 7/18521 | 709/226 |
| 2024/0048458 A1* | 2/2024 | Hardy | H04L 41/40 | |

OTHER PUBLICATIONS

Condon, S., "CES 2019: Verizon showcases the potential of 5G with drones, Disney and more," ZDNET, Jan. 8, 2019, 7 pages, retrieved from https://www.zdnet.com/article/ces-2019-verizon-showcases-the-potential-of-5g-with-drones-disney-and-more/.

Tasevski, S., "5G and Drones," DroneBelow.com, Aug. 31, 2018, 2 pages, retrieved from https://dronebelow.com/2018/08/31/5g-and-drones/.

Samsung, "Samsung, Cisco and Orange Demonstrate 5G-Powered Drone and Industrial Robot at MWC19," Samsung Newsroom, Feb. 26, 2019, 5 pages, retrieved from https://news.samsung.com/global/samsung-cisco-and-orange-demonstrate-5g-powered-drone-and-industrial-robot-at-mwc19.

Patel, N., "The Sky Is the Limit in 5G Game of Drones," eInfochips, Dec. 11, 2019, 7 pages, retrieved from https://www.einfochips.com/blog/sky-limit-5g-game-drones/.

Mehar, P, "NASA Is About to Test a Giant Solar Drone That Broadcasts 5G," Tech Explorist, Mar. 9, 2019, 4 pages, retrieved from https://www.techexplorist.com/nasa-test-giant-solar-drone-broadcasts-5g/21473/.

Tangerman, V., "NASA Is About to Test a Giant Solar Drone That Broadcasts 5G," The-Byte, Mar. 8, 2019, 6 pages, retrieved from https://futurism.com/the-byte/aerovironment-softbank-5g-drone-uav.

* cited by examiner

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

CONNECTION REQUEST MANAGEMENT CODE 150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

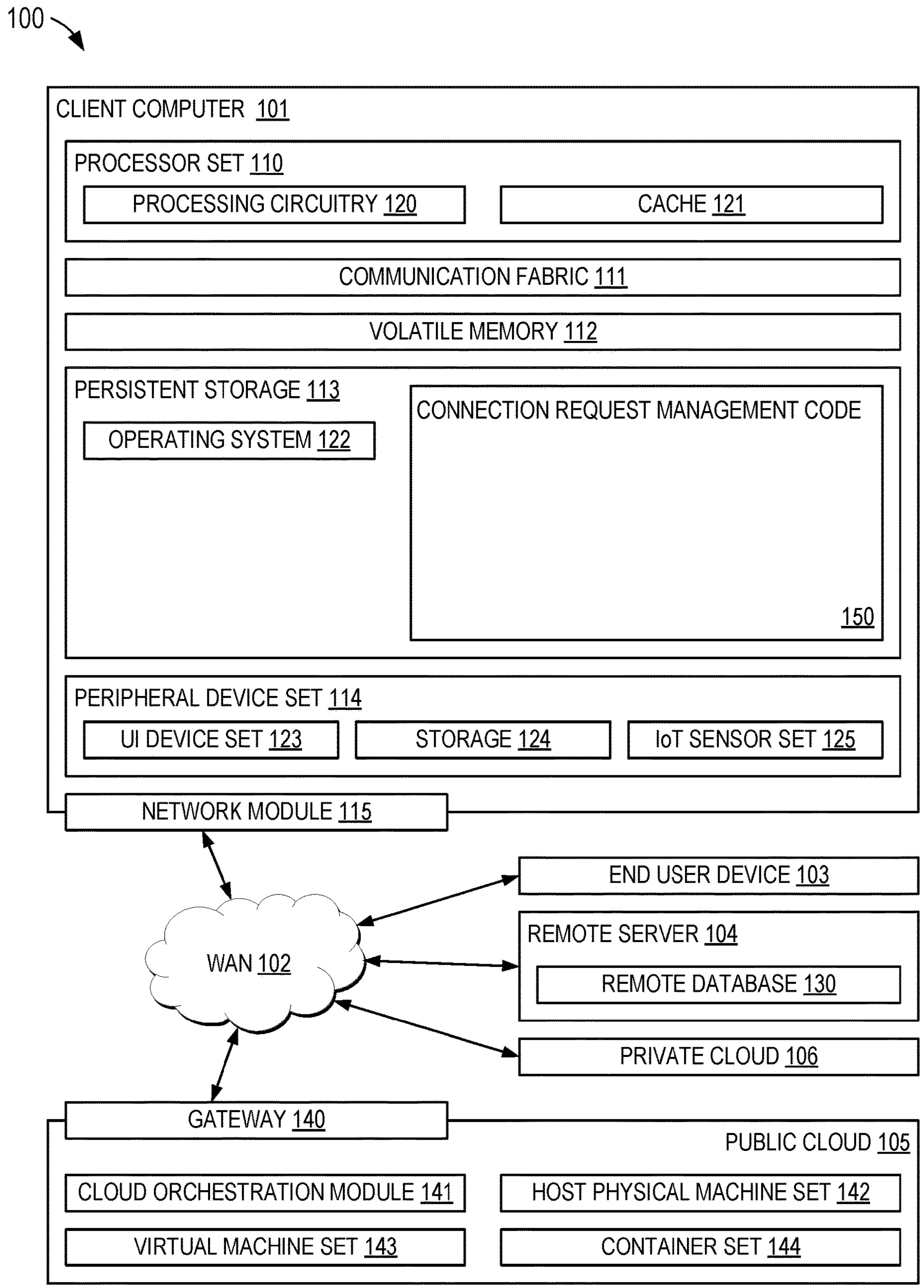

FIG. 1

S2
S1
S3
S4
LEO1 User Plane

S2'
S3'
LEO2 User Plane

608

LEO Mesh Link

CONN_XFER

602

604

DTCH_CONN_RESP

DTCH_CONN_CREATE

SERVICE_REQ(S4)

DTCH_SERVICE_REQ_RESP

DTCH controller

Service Requirement

App Space

Platform Interface

606

600

MANAGEMENT OF CONNECTION REQUESTS BASED ON SERVICES LOADED ON SATELLITES

BACKGROUND

The present invention relates to satellites, and more specifically, this invention relates to offloading connection requests from satellites determined to have relatively less services needed to fulfill the connection requests loaded, to satellites having relatively more of the services loaded.

Communication networks typically include a plurality of communication devices that communicate with other communication devices via wireless signals. For example, the communication devices may be edge devices including, e.g., computers, cellular phones, fax machines, network enabled tablets, etc. These wireless signals are sometimes relayed via communication relay devices on the Earth's surface, e.g., ground antennas, routers, modems, etc. In some cases, these wireless signals may additionally and/or alternatively be transmitted via connection requests that are output from communication devices to satellites and/or connection sessions that are established between a satellite and communication devices to fulfill connection requests.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds. Applications are used by satellites to run services in order to enable these storing, processing, and analyzing operations.

SUMMARY

A computer-implemented method, according to one embodiment, includes receiving, on a first satellite, a first connection request, and analyzing the first connection request to determine services needed to fulfill the first connection request. In response to a determination that the first satellite does not have at least a predetermined number of the determined services loaded, a predetermined offload process is performed. Performing the predetermined offload process includes identifying at least one satellite having a footprint coverage region that simultaneously matches a footprint coverage region of the first satellite within a first area of Earth's surface, and determining whether a first of the identified satellites has at least the predetermined number of the determined services loaded. Performing the predetermined offload process furthermore includes causing the first connection request to be offloaded to the first identified satellite in response to a determination that the first identified satellite has at least the predetermined number of the determined services loaded.

A computer program product, according to another embodiment, includes a computer readable storage medium having program instructions embodied therewith. The program instructions are readable and/or executable by a processing circuit of a first satellite to cause the processing circuit of the first satellite to perform any combination of features of the foregoing methodology.

A system, according to another embodiment, includes a processor of a first satellite, and logic integrated with the processor, executable by the processor, or integrated with and executable by the processor. The logic is configured to perform any combination of features of the foregoing methodology.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2A:
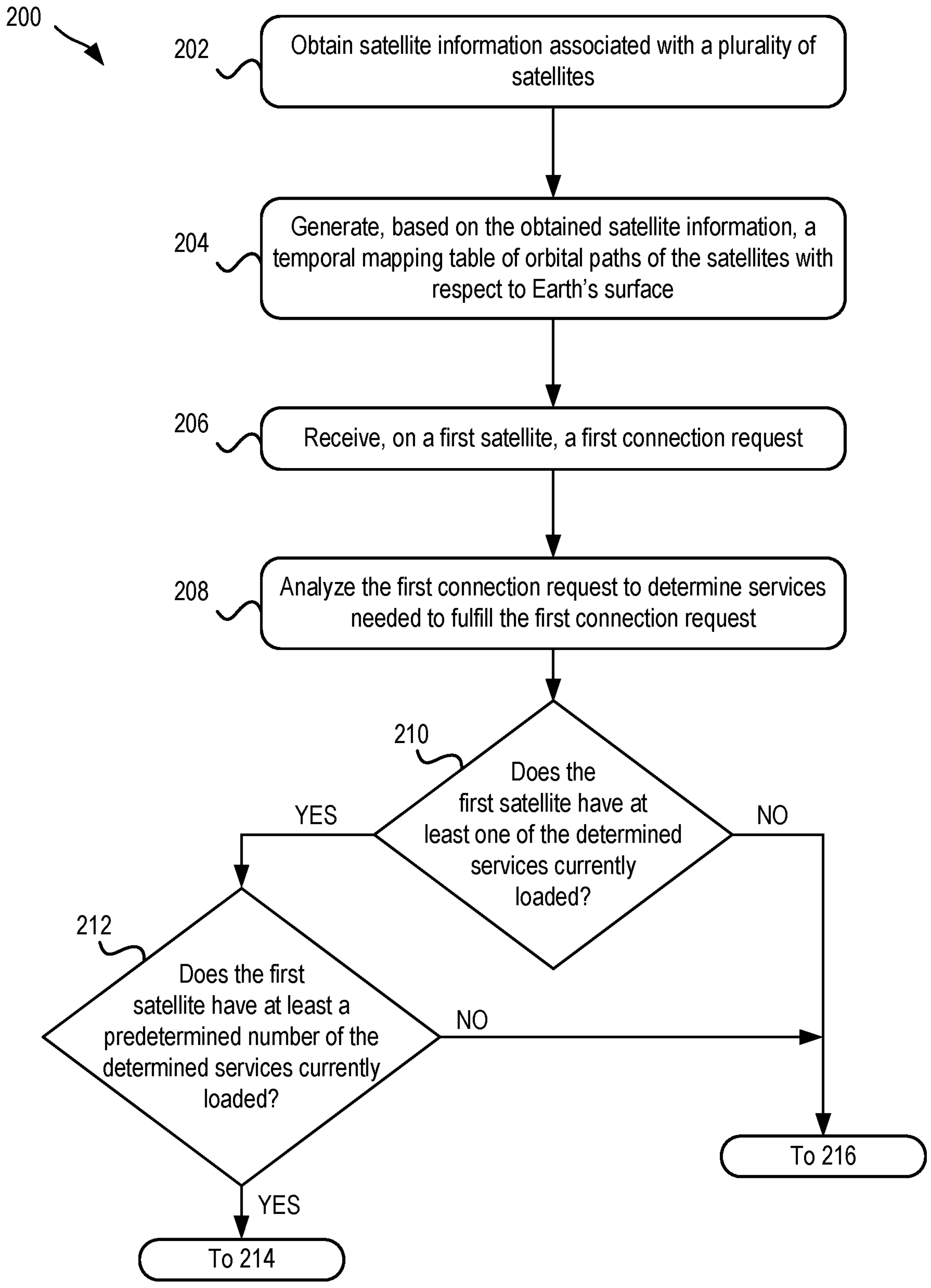
FIG. 2A is a flowchart of a method, in accordance with one embodiment of the present invention.
Figure 2A:
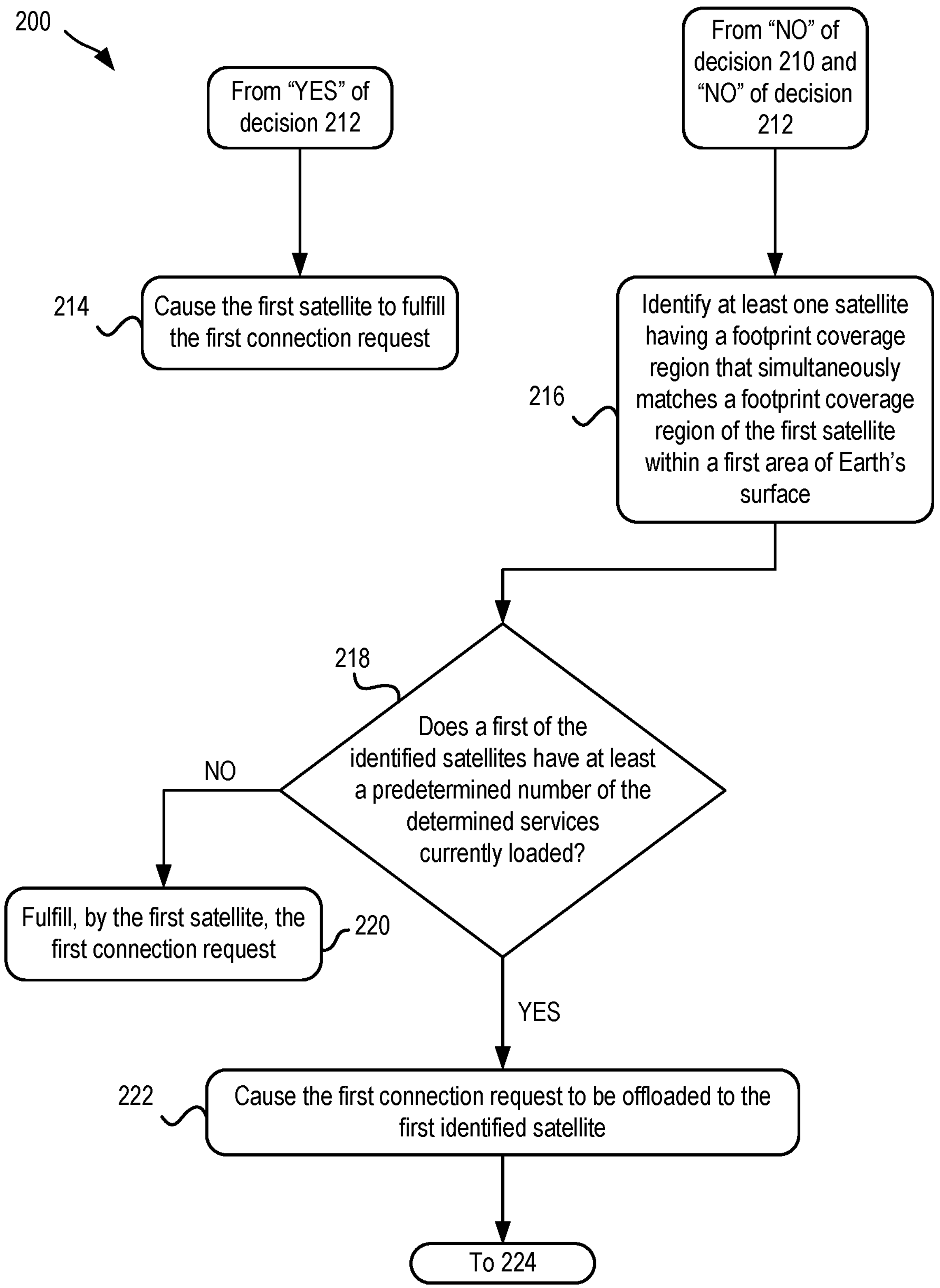
Figure 2A:
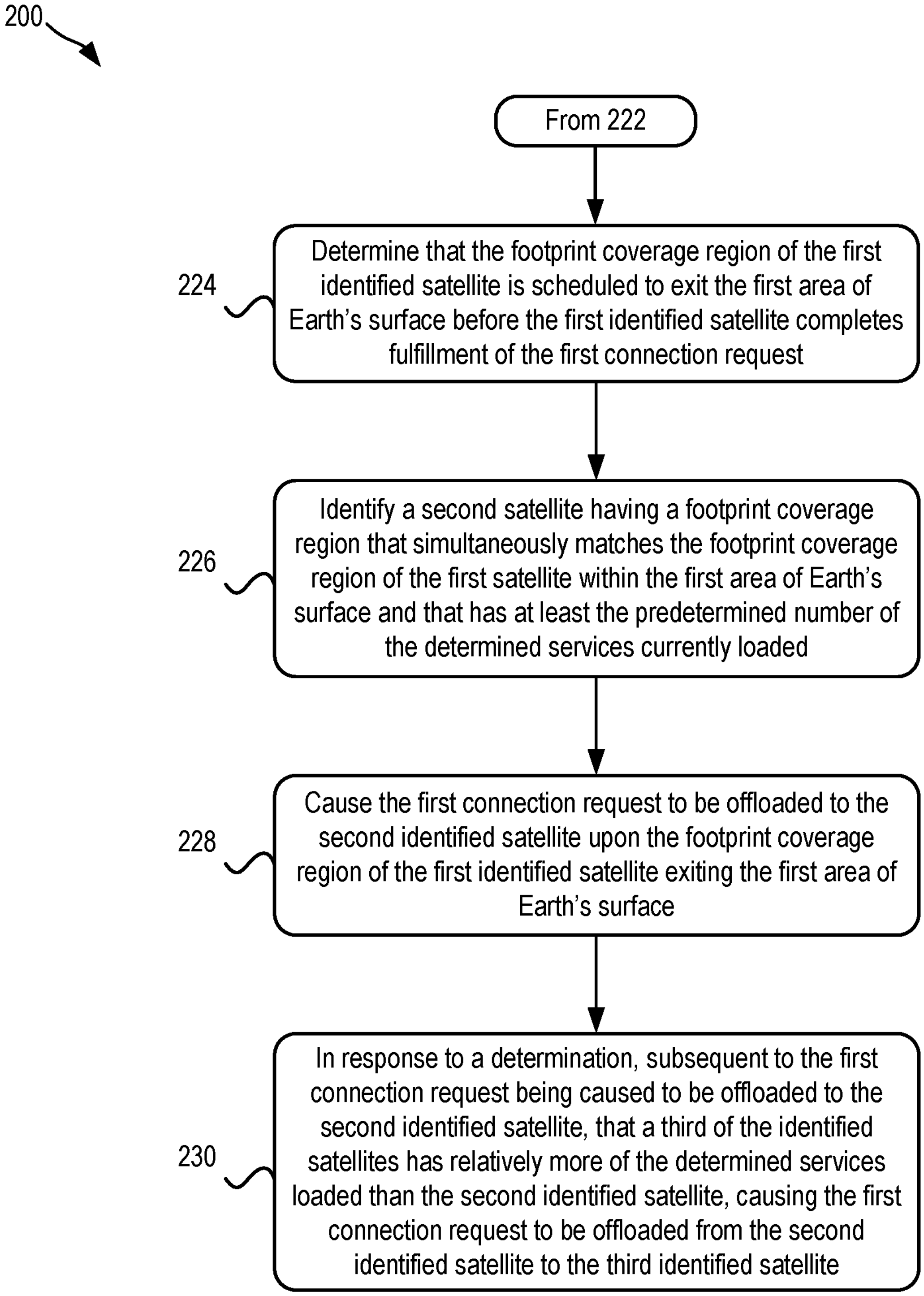

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for offloading connection requests from satellites determined to have relatively less services needed to fulfill the connection requests loaded, to satellites having relatively more of the services loaded.

In one general embodiment, a computer-implemented method includes receiving, on a first satellite, a first connection request, and analyzing the first connection request to determine services needed to fulfill the first connection request. In response to a determination that the first satellite does not have at least a predetermined number of the determined services loaded, a predetermined offload process is performed. Performing the predetermined offload process includes identifying at least one satellite having a footprint coverage region that simultaneously matches a footprint coverage region of the first satellite within a first area of Earth's surface, and determining whether a first of the identified satellites has at least the predetermined number of the determined services loaded. Performing the predetermined offload process furthermore includes causing the first connection request to be offloaded to the first identified satellite in response to a determination that the first identified satellite has at least the predetermined number of the determined services loaded.

In another general embodiment, a computer program product includes a computer readable storage medium having program instructions embodied therewith. The program instructions are readable and/or executable by a processing circuit of a first satellite to cause the processing circuit of the first satellite to perform any combination of features of the foregoing methodology.

In another general embodiment, a system includes a processor of a first satellite, and logic integrated with the processor, executable by the processor, or integrated with and executable by the processor. The logic is configured to perform any combination of features of the foregoing methodology.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as connection request management code of block 150 for offloading connection requests from satellites determined to have relatively less services needed to fulfill the connection requests loaded, to satellites having relatively more of the services loaded. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, communication networks typically include a plurality of communication devices that communicate with other communication devices via wireless signals. For example, the communication devices may be edge devices including, e.g., computers, cellular phones, fax machines, network enabled tablets, etc. These wireless signals are sometimes relayed via communication relay devices on the Earth's surface, e.g., ground antennas, routers, modems, etc. In some cases, these wireless signals may additionally and/or alternatively be transmitted via connection requests that are output from communication devices to satellites and/or connection sessions that are established between a satellite and communication devices to fulfill connection requests.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds. Applications are used by satellites to run services in order to enable these storing, processing, and analyzing operations.

Low earth orbit (LEO) satellite datacenters and mechanisms to send and receive information from LEO satellites directly via a communication network offers a performance benefit to applications and devices accessing data from LEO satellites directly. For example, because devices may be directly connected to LEO processing locations, a transmission latency is relatively very low due to the omitted interference of intermediate network components. Furthermore, because LEO satellites orbit relatively close to Earth's surface, they can be used for communication purposes where the device (mobile or IoT devices) on Earth can connect directly to the LEO satellites for performing a data exchange (instead of earth based E-UTRAN Node Bs hereafter referred to as "eNodeBs"). This enables relatively faster data transmission between a network and devices because they are directly connected to a LEO satellite. Conventional 5G devices and future 6G capable devices that are already being tested may be configured to possess capabilities to interact with satellites (LEO satellites) configured to perform the techniques described herein to ensure that connection requests are efficiently fulfilled using a satellite that is already running and/or is scheduled to run services needed to fulfill the connection request.

LEO satellites typically orbit Earth's surface at relatively lower altitudes (an altitude of less than one thousand kilometers (kms) and as close as one hundred and sixty kms to Earth's surface) than geo-stationary satellites, and therefore are not stationary with respect to Earth's movement. Because this movement of LEO satellites can be observed from Earth, and LEO satellites are relatively much closer to Earth's surface than other satellites, to maintain a rotation equilibrium, the speed of LEO satellites is relatively greater, which impacts the footprint region when these LEO satellites are used for direct connection purposes. This also means that the footprint coverage region, e.g., the region of Earth's surface that a given satellite can accept and process connection requests from at a given time, is fairly limited for LEO satellites, as well as associated coverage timelines. For this reason, there may be multiple LEO satellites orbiting a plane of Earth which act as a mesh to offer continuous coverage for an area. The LEO satellites in the mesh are configured to communicate with one another via an inter-satellite link which offers a relatively high speed network line between the LEO satellites. These orbits being relatively close to Earth's surface allow direct microwave transmission to be performed from edge devices to LEO satellites, which may be used in order to transfer data directly from user edged devices to LEO satellites.

Enablement of LEO satellite datacenters and mechanisms to send and receive information from these LEO satellites directly via a communication network offers a performance benefit to the applications and devices accessing the data from LEOs directly. Because the device is directly connected to LEO processing locations, the transmission latency is relatively low due to omitted interference of intermediate network components. Furthermore, because these LEO satellites are orbiting relatively close to Earth's surface, LEO satellites can be used for communication purpose where the device (mobile or IoT devices) on Earth can connect directly to the LEO satellites for making data exchange (instead of Earth based eNodeBs). This allows for relatively faster data transmission between network to devices because they are directly connected to a LEO satellite. 5G and/or 6G capable mobile devices may possess the capability to connect to the LEO transceivers, where LEO satellites act as eNodeB and serve the connection to the target endpoints.

Multiple satellites may simultaneously serve the same area of Earth's surface. This is because footprint coverage regions of these satellites (where each "footprint coverage region" is the region of Earth's surface that a given satellite can accept and process connection requests from at a given time) may cover the same area of Earth's surface (portion of Earth's surface) at a given time. In use cases of 5G and 6G communication technologies, a service orchestration layer may be located on top of connection management services and process the edged services which process data at the edge. In this service-oriented architecture, the services are loaded at the edge (which is a LEO satellite) in this case, and all the edge processing occurs in the LEO where service instances are loaded in the LEO satellite's service orchestration layer. However, these different LEO satellites which have footprint coverage regions covering the same area of Earth's surface often have different capabilities in terms of services that can be loaded on the LEO satellites. For example, a data deduplication or stream data deduplication service may be loaded on a first LEO satellite, but may not be loaded on a second satellite. Such a service calls for relatively high CPU power, and therefore the second satellite loading the service instead of relying on the first satellite incurs significant overhead. Conventional satellite infrastructure and connection request scheduling techniques do not account for or even consider the different services that different satellites have loaded. Accordingly, these conventional techniques do not manage connections depending on the services required for the target endpoints. This is problematic in a plethora of use cases from a performance standpoint. For example, there may be some endpoints such as media coverage that need data deduplication or watermarking services which are already deployed and running on a first LEO satellite. However, because running services are not considered in conventional connection request fulfilment, there is no way for this information to be located and connection requests to be scheduled in such a way that allows connection devices from such endpoint devices to be scheduled to the first LEO satellite. Accordingly, using these conventional techniques, these connection requests may very likely be caused to be fulfilled by a different LEO satellite that has to load applications that include such services. This ultimately results in an additional overhead load being incurred, which would not otherwise have been incurred had the connection requests been offloaded to the first LEO satellite.

In sharp contrast to the deficiencies described above, the techniques of various embodiments and approaches described herein perform a predetermined offload process for ensuring a connection request is offloaded from a satellite running relatively less services for fulfilling the connection request a satellite running relatively more services for fulfilling the connection request.

Now referring to FIG. 2A, a flowchart of a method 200 is shown according to one embodiment. The method 200 may be performed in accordance with the present invention in any of the environments depicted in FIGS. 1-7, among others, in various embodiments. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be perfect that the operations of method 200 may be performed using infrastructure associated with 5G and/or 6G networks. In some approaches, this infrastructure includes a connection processing LEO satellite infrastructure management plane. This plane may, in some approaches, be implemented by a processing circuit of a satellite that is configured to perform the operations of method 200. As will be described in detail elsewhere below, these operations provide a relatively effective way to coordinate assignment and/or reassignment of connection requests based on services that satellites have running and/or are scheduled to run while footprint coverage regions of the satellites are within a given area of Earth's surface, e.g., an area from which the connection requests are received.

In some approaches, the operations of method 200 may be performed in a service orchestration layer of a 5G and/or 6G telecom network and collects the information about satellites having overlapping footprint coverage regions for a given area of Earth's surface. A control plane of the orchestration layer may be enquired to obtain this information. For context, footprint coverage regions of two or more satellites may overlap based on the satellites covering the same region either for a workload balancing purpose or as part of the satellite's revolution to Earth on their orbital plane.

Operation 202 includes obtaining satellite information associated with at least a first satellite (hereafter referred to as the "first satellite"). In some preferred approaches, satellite information for a plurality of satellites is obtained. At least some of the satellites are LEO satellites.

The satellite information may be obtained by a processing circuit that is located in the satellite(s) and/or by a processing circuit that is in communication with at least one of the satellites. In some preferred approaches, communication processing circuits of the satellites, which may be of a type that would become apparent to one of ordinary skill in the art after reading the descriptions herein, are configured to communicate with one another to exchange information, e.g., via established handshakes. These processing circuits of the satellites may additionally and/or alternatively be configured to offload jobs received by one or more of the satellites to one or more of the other satellites (e.g., for another satellite to perform) and/or accept jobs from any of the satellites. Furthermore, in such an approach, the processing circuit may additionally and/or alternatively be configured to use the satellite information pertaining to other satellites to determine one or more metrics associated with the other satellites. In some other approaches, the satellite information may be obtained by a computer that is in communication with one or more of the satellites. The satellite information may, in some approaches, include, e.g., identifiers (IDs) of satellites, predetermined metrics associated with the satellites, software versions being run on the different satellites, etc. In some approaches the predetermined metrics associated with the satellites include, e.g., a current altitude of a satellite, a trajectory of a satellite, orbital plane information of a satellite, an average moving speed of a satellite, an orbital path of a satellite, a shape of a satellite's orbital path, etc. The processing circuits of the satellites may additionally and/or alternatively be configured to initiate performance of management activities on an associated one of the satellites, e.g., application updates, housekeeping operations, garbage collection operations, etc.

In some preferred approaches, each satellite may be configured to initiate and perform a process for determining movement arrangements of other satellites. For example, assuming the that first satellite of the plurality of satellites is performing the operations of method 200, upon instantiation, data structures may be loaded to an application running one or more service instances of the first satellite, and predefined data collection resources of the first satellite, may be caused, e.g., triggered, to send data streams to other satellites while identifying and/or receiving data locations of the other satellites. For context, one or more applications of a given one of the satellites may run these services for fulfilling predetermined tasks. In other words, each of the application "services" may be a program run by a processing circuit of a given one of the satellites to cause one or more operations to be performed. For example, a first service of an application of a first satellite may be program code, that when executed, is configured to cause predetermined operations to be performed that include collecting satellite information about the other satellites.

In some other approaches, one or more services of the first satellite may be run to fulfill connection requests that the first satellite accepts, e.g., from a first edge device on Earth's surface. In yet some other approaches, one or more instances of the services run on the first satellite may be configured to collect information about a pool of LEO satellite locations that can be used as a temporary home for connection processing. In other words, a list and a capacity of an extent of connection requests that services of a given one of the satellites is able to handle at a given point in time may be decoded from configuration parsing approaches. These configuration parsing approaches may, in some approaches, include outputting enquiries to other satellites, where the enquiries request satellite information that details statuses of services loaded on the satellites. More specifically, one or more of these enquiries may request information that details when the satellites will be running different services. As will be described elsewhere below, this information may be used to determine which of the satellites is best suited, e.g., based on the extent of services that a satellite has running, as a target for a received connection request. In some approaches, a softwarization management plane and/or virtual network functions may be used to obtain the satellite information. For example, in one or more of such approaches, the satellite information is obtained as a result of using insertions to a softwarization management plane and/or the triggering of predetermined virtual network functions to cause data transmission over a predetermined communication line. LEO infrastructure API instances may additionally and/or alternatively be initiated, and handshaking may be performed that is further used to transmit data requirement signals and recognition of predetermined events, e.g., a footprint coverage region of a satellite entering a predetermined area, a footprint coverage region of a satellite exiting a predetermined area, etc., by an orchestration plane.

Subsequent to obtaining the satellite information, the obtained information may be used to determine movement of the satellites with respect to Earth. For example, the obtained satellite information may be used to determine the trajectory of the first satellite, a trajectory of a second of the satellites, a trajectory of a third of the satellites, etc. In some approaches, the trajector(ies) of at least some of the satellites may be determined, e.g., based on tracked historical orbital information associated with the satellite(s), based on a current tracking of the satellite(s), from a table of predetermined metrics in the obtained information, etc.

Method 200 may additionally and/or alternatively include determining footprint coverage regions of the satellites based on the obtained information. For context, the footprint coverage region of a satellite is an area of a predetermined surface, e.g., Earth's surface, below the orbiting satellite that the satellite is within range of connecting to, e.g., connecting to one or more target devices located in the area of Earth's surface. The area of Earth below the orbiting satellite that makes up the footprint coverage region of the satellite may depend on communication hardware of the satellite. For example, in some approaches, a first LEO satellite may have a relatively larger footprint coverage region than a footprint coverage region of a second LEO satellite as a result of the second LEO satellite having relatively more outdated communication hardware, e.g., signal broadcasting hardware of a processing circuit. The footprint coverage region of a satellite may be determined based on metrics associated with the satellite, e.g., metrics from the obtained satellite information. For example, a footprint coverage region of a first satellite may be determined based on metrics associated with the first satellite, e.g., a current altitude, a trajectory, orbital plane information and an average moving speed. Techniques for determining a connectivity and/or communication range of a satellite, based on metrics associated with the satellite, that would become apparent to one of ordinary skill in the art after reading the descriptions herein may be used.

Operation 204 includes generating, based on the obtained satellite information, a temporal mapping table of orbital paths of the satellites with respect to Earth's surface. In some preferred approaches, the temporal mapping table stores positional information about the satellites and the respective footprint coverage regions of the satellites with respect to Earth's surface. For example, the information of the table may include, e.g., global positioning system (GPS) coordinates of the satellites, average moving speeds of the satellites, scheduled operational downtime of the satellites, processing resource availabilities of the satellites with respect to different GPS coordinates of the satellites, etc., and may preferably be generated using the obtained satellite information. The temporal mapping table may, in some approaches, be generated by appending the footprint coverage regions of the satellites with Earth's surface on a predetermined map of the table, e.g., to visually indicate the footprint coverage regions of the satellites as the satellites traverse with respect to Earth's surface. In some approaches, this appending may be performed by injecting a ground surface coordinate map with satellite geographical location information and altitudes of the satellites. The map and other information of the temporal mapping table may, in some preferred approaches, be updated after regular pre-defined intervals in order to maintain accuracy as relative positions of the satellites change over time.

A first connection request may be received on the first satellite, e.g., see operation 206. In some approaches the connection request is a direct channel (DTCH) request that is received from a first edge device on Earth's surface. The first connection request may, in some approaches, request that the first edge device connect to the first edge device for performing one or more tasks specified in the connection request. For example, the connection request may specify a task that includes, e.g., streaming video data between the first satellite and the first edge device, uploading data to the first satellite, causing the first edge device to borrow processing resources from the first satellite for a predetermined workload, causing the first satellite to borrow processing resources from the first edge device for a predetermined workload, etc.

Connection requests may be received by the satellites in response to footprint coverage regions of the receiving satellites entering into an area of Earth's surface that one or more edge devices that send the connection requests to the satellites are located in. For example, in some approaches, the first connection request is received by the first satellite from the first edge device in response to the footprint coverage region of the first satellite entering into an area of Earth's surface that the first edge device is located in.

In some approaches, the first satellite may be capable of fulfilling the first connection request. In other words, in one or more of such approaches, the first satellite may be capable of running application services needed to fulfill the first connection request. However, this fulfillment of the first connection request may include the first satellite having to load at least some of these services needed to fulfill the first connection request. Preferred approaches described herein consider whether another satellite that is already running relatively more of the services needed to fulfill the received first connection request. For context, another satellite that is already running relatively more of the services needed to fulfill the received first connection request may be caused to fulfill the first connection request instead of the first satellite fulfilling the first connection request in order to relatively reduce an amount of resources that are expended in fulfilling the first connection request. More specifically, this reduction includes relatively reducing the amount of service(s) that are loaded to fulfill the first connection request. Accordingly, method 200 preferably includes analyzing the first connection request to determine services needed to fulfill the first connection request, e.g., see operation 208.

Analyzing the first connection request to determine the services needed to fulfill the first connection request may, in some approaches, include parsing details included in the connection request using techniques that would become apparent to one of ordinary skill in the art after reading the descriptions herein. In one or more of these approaches, results of the parsing may identify workload tasks that are each associated with one or more applications and/or services of the application that are determined to be capable of being used to complete the tasks. For context, the determined "services" needed for fulfilling the first connection request may, in some approaches, include resources for offloading data from an edge device from which the first connection request is received. Illustrative services may, in some approaches, include deduplicating data, transferring a video stream, fingerprinting, transferring an audio stream, transmission control protocol (TCP) offloading, borrowing processing resources to perform a predetermined task, at least temporarily storing data, etc.

Analyzing the first connection request to determine the services needed to fulfill the first connection request may, in some approaches, additionally and/or alternatively include enquiring a new DTCH creation for service capabilities requirements in case an application specific logical channel implementation is used at the initiator device, e.g., first user device, endpoints. In such an implementation, each application may be responsible for managing the DTCH connection and the associated characteristics, e.g., such as bandwidth, quantum communication infrastructure (QCI) and target service connection identifier, etc. In such cases, the target service identifier may be needed for the endpoint application (on a mobile device) to understand which service is needed from the orchestration plane (user plane of service orchestration) for the target. When the service is received as part of DTCH_CREATE response, a determination is first made as to whether a respective service activation is present on a self-instance on the satellite that received the connection request. In response to a determination that the respective service activation is not present, e.g., but instead the respective service is unloaded and/or inactive, instead of provisioning the service on the first satellite, method 200 includes determining whether another of the satellites that is covering the same region has the service loaded. This process is described elsewhere below, e.g., see operations 216-218.

With the services needed to fulfill the first connection request determined, an additional determination may be performed to determine whether any of the satellites have each of the determined services loaded. In other words, a determination may be made as to whether one or more of the satellites, e.g., the satellites having associated information in the generated temporal mapping table, can fulfill the first connection request without the satellite loading services not already loaded, e.g., instantiated, on the satellite. In some preferred approaches, this determination includes and/or begins with the first satellite that received the first connection request. The first satellite may, in some approaches, be determined to have a relatively highest priority for fulfilling the first connection request in response to a determination that the first satellite has each of the determined services loaded. In such an approach, the first satellite is preferred for fulfilling the first connection request because the first satellite would not have to offload the first connection request to another of the satellites and because the first satellite would not have the load any services and/or applications associated with the services in order to fulfill the first connection request. Accordingly, method 200 optionally includes determining whether the first satellite has at least one of the determined services currently loaded, e.g., see decision 210. In some approaches, application logs (that detail services running for active applications) may be referenced to determine the services that the first satellite has currently loaded.

In response to a determination that the first satellite has at least one of the determined services currently loaded, e.g., as illustrated by the "YES" logical path of decision 210, in some approaches, a determination may be made as to whether the first satellite has at least a predetermined number of the determined services currently loaded, e.g., see decision 212. In some approaches, the predetermined number of the determined services is all of the determined services. In some other approaches, the determined number is a majority of the determined services. In some other approaches, the determined number is one of the determined services. In some other approaches, the determined number is based on the extent of processing resources that offloading the first connection request to another satellite would take. More specifically, the predetermined number of the determined services may, in some approaches, be dynamically set such that offloading the first connection request to another satellite (in response to a determination that the first satellite does not have at least the predetermined number of the determined services currently loaded) does not consume more processing resources than an amount of processing resources that the first satellite loading the determined services, i.e., the determined services that are not currently loaded on the first satellite, would take. This way, any offload of a connection request or the decision for the first satellite to instead perform the connection request, is ensured to preserve processing resources.

In response to a determination that the first satellite has at least the predetermined number of the determined services loaded, e.g., as illustrated by the "YES" logical path of decision 212, the first satellite is caused to fulfill the first connection request, e.g., see operation 214. In some approaches in which the predetermined number of determined services is all of the determined services, no services are loaded in the first satellite's fulfillment of the first connection request. In some other approaches in which the predetermined number of determined services is less than all of the determined services, fulfillment of the first connection request may include the first satellite loading the determined services that are not yet loaded on the first satellite.

The first satellite may perform operations of a type that would become apparent to one of ordinary skill in the art after reading the present descriptions to fulfill the first connection request. In some approaches, the first satellite completes fulfillment of the first connection request before the footprint coverage region of the first satellite exits the first area of Earth's surface. In contrast, in some other approaches, the first satellite does not complete fulfillment of the first connection request before the footprint coverage region of the first satellite exits the first area of Earth's surface. In such approaches, method 200 optionally includes identifying another of the determined satellites for completing a remaining portion of the connection request, and causing, e.g., offloading the connection request with an indication of the completed portions of the connection request and/or an indication of the incomplete portions of the connection request, the identified satellite to fulfill the remaining portion of the request. In some preferred approaches, the identified satellite is one of the determined satellites that has relatively more of the determined services loaded than the amount of determined services that any of the other determined satellites have loaded. Techniques described elsewhere below may be used to determine a satellite that has relatively more of the determined services loaded.

Referring again to decision 210, in response to a determination that the first satellite does not have at least one of the determined services currently loaded, e.g., as illustrated by the "NO" logical path of decision 210, method 200 optionally includes performing a predetermined offload process. Similarly, referring again to decision 212, in response to a determination that the first satellite does not have at least the predetermined number of the determined services currently loaded, e.g., as illustrated by the "NO" logical path of decision 212, method 200 optionally includes performing the predetermined offload process. It should be noted that, although various approaches herein describe determinations being performed based on services that a given satellite has currently loaded, in some other approaches, these determinations may additionally and/or alternatively be based on services that a considered satellite is scheduled to load and/or are determined from the obtained information to have been previously loaded by the considered satellite while a footprint coverage region of the considered satellite is within a first area of Earth's surface while the footprint coverage region of the first satellite is simultaneously within the first area of Earth's surface.

In some approaches, performing the predetermined offload process includes identifying, e.g., see operation 216, at least one satellite having a footprint coverage region that simultaneously matches the footprint coverage region of the first satellite within the first area of Earth's surface, e.g., overlapped trajectory footprint coverage region. For context, satellites having such footprint coverage regions are identified because any satellite that the first connection request is offloaded to needs to be within a range of the first area of Earth's surface that enables fulfillment of the first connection request. For example, in the event that the first connection request was otherwise offloaded to a satellite having a footprint coverage region that does not extend within the first area of Earth's surface, the satellite that the first connection request is offloaded to may be unable to communicate with and/or connect to the first edge devices that sent the first connection request.

It should be noted that the identified satellite(s) preferably have footprint coverage region(s) that simultaneously match the footprint coverage region of the first satellite within the first area of Earth's surface for at least a predetermined amount of time. For example, in some preferred approaches, the identified satellite(s) preferably have footprint coverage region(s) that simultaneously match the footprint coverage region of the first satellite within the first area of Earth's surface within a predetermined amount of time that the connection request is received so as to ensure that initiation of fulfillment of the connection request is not delayed more than the predetermined amount of time.

In some preferred approaches, the generated temporal mapping table is used to identify that the footprint coverage region of a first of the identified satellite simultaneously (hereafter referred to as the "first identified satellite") matches the footprint coverage region of the first satellite (the satellite that receives the connection request) within the first area of Earth's surface. For example, a map and/or entries of the temporal mapping table may be parsed to identify the first identified satellite based information associated with the first identified satellite determining to have at least a predetermined degree of similarity with information associated with the first satellite in the temporal mapping table. Techniques for determining relative degrees of similarity of collections of information of a table that would become apparent to one of ordinary skill in the art after reading the descriptions herein may be used. In some other approaches, illustrative information of the generated temporal mapping table that may additionally and/or alternatively be used to determine whether the footprint coverage region of the first identified satellite simultaneously matches the footprint coverage region of the first satellite within the first area of Earth's surface may include LEO satellite universally unique identifiers (UUIDs), software eNodeB IDs, and other static metadata which may be derived from configuration parsing approaches. For example, this illustrative information about LEO satellites may be used to determine trajectories of individual LEO satellites that are thereafter mapped against the validity of an event, e.g., the intersecting of two of more of the trajectories within the first area of Earth's surface.

In response to identifying that the footprint coverage region of the first identified satellite simultaneously matches the footprint coverage region of the first satellite within the first area of Earth's surface, the first identified satellite is caused to be registered with the first satellite. For context, registration of the first identified satellite with the first satellite and/or any of the other identified satellites with the first satellite may be performed by establishing a handshake between the satellites. The registration of one or more of the identified satellites with the first satellite may enable communication lines between the first satellite that may be used to offload the first connection request. More specifically, these communication lines may place the identified satellites on call as candidates for accepting the connection request from the first satellite in the event that the first satellite selects one of the identified satellites for offloading the first connection request to. In some approaches, satellites that are determined to have the same footprint coverage region within a predetermined area of Earth's surface are caused, e.g., instructed, to register with one another and maintain real time records with one another using handshake techniques that would become apparent to one of ordinary skill in the art after reading the descriptions herein. This registration of satellites may optionally be added to the temporal mapping table and used to thereafter determine which satellites are currently covering the same region, e.g., have matching footprint coverage regions. For example, in some approaches, an identity of a second satellite having a matching footprint coverage region may be collected from the temporal mapping table and a connection manager of another satellite, e.g., the first satellite, may cause a connection request to be offloaded to the second satellite where determined services are already running.

Although various approaches above describe satellite information being proactively obtained in order to generate and use a temporal mapping table, in some other approaches, method 200 may additionally and/or alternatively include locating devices and logical channels (DTCHs) that are created from a user device from an footprint region, in response a determination that overlapping trajectories of footprint coverage regions exist between two or more satellites. In one or more of these approaches, these devices and logical channels are located to determine and understand additional services that would need to be provisioned and loaded on the satellites in order to fulfill a received connection request.

In order to determine at least one of the identified satellites for offloading the first connection request to, the respective services that the identified satellites have currently loaded may be considered. It should be noted that, although various approaches below describe the consideration of the first identified satellite, in some approaches, the other identified satellites may additionally and/or alternatively be considered. Decision 218 includes determining whether the first of the identified satellites has at least a predetermined number of the determined services currently loaded. In some approaches, the predetermined number of the determined services is the predetermined number of services described elsewhere herein, e.g., see decision 212. In some other approaches, the predetermined number of the determined services is set to be one service more than the number of the services that the first satellite has loaded. This way, a determination may be made as to whether any of the identified satellites have more services loaded than the first satellite. Illustrative techniques for determining whether the first identified satellite has at least the predetermined number of the determined services loaded are described in FIG. 2B.

Figure 2B:
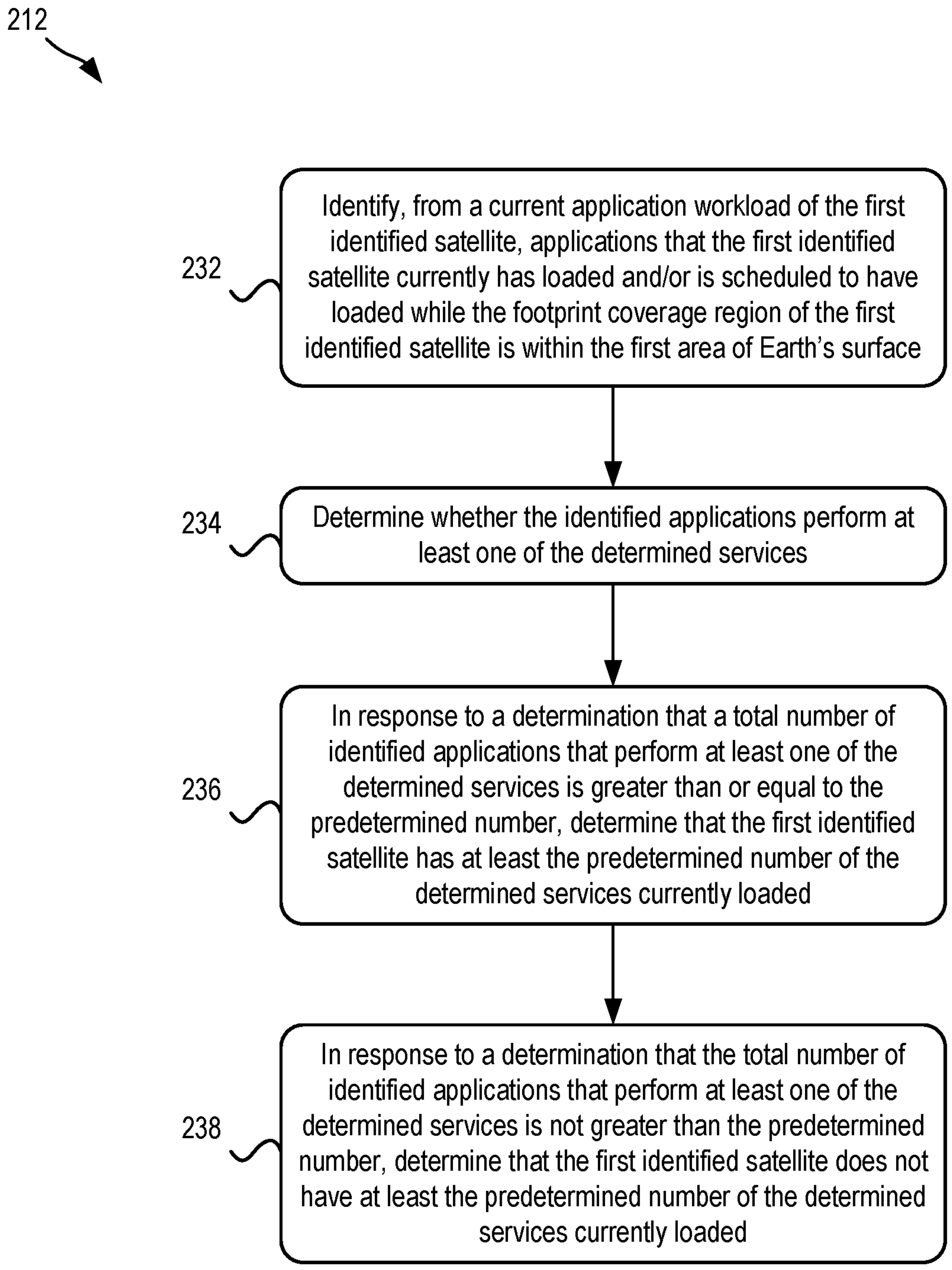
FIG. 2B is a flowchart of sub-operations of an operation of FIG. 2A, in accordance with one embodiment of the present invention.

Looking to FIG. 2B, exemplary sub-operations of determining whether an identified satellite has at least the predetermined number of determined services loaded are illustrated in accordance with one embodiment, one or more of which may be used to perform decision 218 of FIG. 2A. However, it should be noted that the sub-operations of FIG. 2B are illustrated in accordance with one embodiment which is in no way intended to limit the invention.

Sub-operation 232 includes identifying, from a current application workload of the first identified satellite, e.g., that is accessible to the first satellite based on the first identified satellite being registered with the first satellite, applications that the first identified satellite currently has loaded and/or is scheduled to have loaded while the footprint coverage region of the first identified satellite is within the first area of Earth's surface. A determination is made as to whether the identified applications perform at least one of the determined services, e.g., see sub-operation 234. Services that the currently loaded applications offer may be determined from, e.g., the obtained information, a predefined dictionary that details application services, information received on the first satellite from the first identified satellite, etc. In response to a determination that a total number of identified applications that perform at least one of the determined services is greater than or equal to the predetermined number, a determination may be made that the first identified satellite has at least the predetermined number of the determined services loaded, e.g., see sub-operation 236. In contrast, in response to a determination that the total number of identified applications that perform at least one of the determined services is not greater than the predetermined number, a determination is made that the first identified satellite does not have at least the predetermined number of the determined services currently loaded, e.g., see sub-operation 238.

In response to a determination that the first identified satellite does not have at least the predetermined number of the determined services currently loaded, e.g., as illustrated by the "NO" logical path of decision 218, method 200 includes fulfilling, by the first satellite, the first connection request, e.g., see operation 220. Furthermore, in response to such a determination, method 200 may additionally and/or alternatively include not offloading the first connection request to one of the identified satellites. In some approaches, fulfilling the first connection request includes loading the services determined to not be currently loaded on the first satellite and using the services loaded on the first satellite to fulfill the first connection request using techniques that would become apparent to one of ordinary skill in the art after reading the descriptions herein. In some approaches, fulfillment of the first connection request includes generating a logical channel between the first satellite and the edge device from which the first connection request is received. For at least some approaches in which the determined services needed for fulfilling the first connection request include resources for offloading data from the edge device from which the first connection request is received, the generated logical channel may have a dedicated bandwidth that is used by applications associated with the determined services for receiving the data from the edge device during the offloading.

It should be noted that although decision 218 is described to be based only on the first identified satellite, in some other approaches in which a plurality of satellites are identified, decision 218 may alternatively be based on a determination of whether each of the identified satellites have at least the predetermined number of the determined services currently loaded. In such approaches, in response to a determination that none of the identified satellites have at least the predetermined number of the determined services currently loaded, the method continues to operation 220.

In contrast, in response to a determination that the first identified satellite (or another of the determined satellites) has at least the predetermined number of the determined services currently loaded, e.g., as illustrated by the "YES" logical path of decision 218, method 200 includes causing the first connection request to be offloaded to the first identified satellite, e.g., see operation 222. In some approaches, causing the first connection request to be offloaded to the first identified satellite includes sending, from the first satellite to the first identified satellite, details about the connection request that was received by the first satellite from the first edge device. Causing the first connection request to be offloaded to the first identified satellite may additionally and/or alternatively include sending a DTCH connection received on the first satellite to the first identified satellite. In this case, an orchestration layer at the first satellite is not expanded because the service will be loaded on the target first identified satellite uniquely. This offload may further help to process the data at an edge where the first satellite is determined to not be capable of instantiating special purpose services that might include hardware and software sensitive services.

The first connection request may additionally be sent to the first identified satellite with an instruction to fulfill the first connection request. Furthermore, in some approaches, the instruction may specify the services that the first identified satellite needs to load to fulfill the first connection request and/or an indication of the services that the first identified satellite already has loaded that will also be used to fulfill the first connection request. In some approaches, in response to a determination that the determined services are no longer needed to fulfill the first connection request and/or the first identified satellite fulfills the first connection request, a service instance on the first satellite may need to be populated. Accordingly, in some approaches, a connection handover of the first connection request and/or details about the fulfillment of the first connection request may be returned to the first satellite. In some approaches, in which a determination is made that the first satellite is not able to spawn the determined services due to one or more limitations and identified satellites are not able to fulfill the first connection request, the first connection request may optionally be offloaded by instructing predetermined mobile endpoint devices and/or a core-cloud service instance to begin processing the data of the first connection request.

Various approaches described above detail offloading of the first connection request to one of the identified satellites in response to a determination that the identified satellite has at least the predetermined number of the determined services currently loaded. However, in some approaches, a plurality of the identified services may have at least the predetermined number of the determined services currently loaded. In order to keep service load overhead to a relative minimum, in some approaches, in response to a determination that a plurality of the identified services may have at least the predetermined number of the determined services currently loaded, one of the identified services having relatively more of the services loaded may be identified and used as a target for offloading of the first connection request. In other words, in some approaches, the first connection request is caused to be offloaded to the first identified satellite in response to a determination that the first identified satellite has relatively more of the determined services loaded than a remainder of the identified satellites. At any time, the services that a given one of the satellites has currently loaded may change. Accordingly, in some approaches, in response to a determination, subsequent to the first connection request being caused to be offloaded to the first identified satellite, that a second of the identified satellites has relatively more of the determined services loaded than the first identified satellite, method 200 may optionally include causing, e.g., outputting an instruction from the first satellite to the first identified satellite, the first connection request to be offloaded from the first identified satellite to the second identified satellite. It should be noted that this determination preferably considers whether the first identified satellite has, in response to receiving the first connection request, already loaded additional services.

Of course, because satellites are non-stationary with respect to Earth's surface, the number of satellites that, at any given time, have footprint coverage region(s) within the first area of Earth's surface ongoingly changes. Based on this movement of the satellites and the rotation of Earth, in some approaches, a satellite that begins to fulfill performance of a connection request may be unable to fulfill the connection request before the footprint coverage region of the satellite exits an area of Earth's surface from which the connection request is received. For example, according to some approaches, the first satellite may initiate fulfillment of the first connection request, but be unable to, e.g., lack the processing resources that would otherwise allow completion of the first connection request, complete the first connection request before the footprint coverage region of the first satellite exits the first area of Earth's surface. In another example, the first connection request may be offloaded from the first satellite to the second satellite, and the second satellite may initiate fulfillment of the first connection request, but be unable to complete the first connection request before the footprint coverage region of the second satellite exits the first area of Earth's surface. In some preferred approaches, a plurality of candidate satellites is identified from the temporal mapping table as satellites having footprint coverage regions that simultaneously match the footprint coverage region of the first satellite within the first area of Earth's surface and that have at least a predetermined number of determined services loaded for fulfilling the first connection request. In one or more of these approaches, a first of the candidate satellites may be identified as being positioned such that a footprint coverage region of the satellite has a relatively longer remaining time within the first area of Earth's surface than the other candidate satellites. However, it may additionally and/or alternatively be determined that a second of the candidate satellites may have relatively more available processing resources associated with the determined services, and therefore an estimated time for the second candidate satellite to complete the first connection request may be less than an estimated time for the first candidate satellite to complete the first connection request. One or more of these determinations may, in some preferred approaches, be used to select one of the candidate satellites that is able to complete all or a relatively largest extent of the first connection request before the footprint coverage region of the satellite exits the first area of Earth's surface. In other words, connection requests are, in some preferred approaches, caused to be fulfilled by a satellite that is determined to be able to fulfill the connection request before exiting an area of Earth's surface that the connection request is received from.

In some approaches, a determination may be made that none of the candidate satellites are able to fulfill a connection request before exiting an area of Earth's surface that the connection request is received from. Various techniques for performing offloading operations to ensure that an incomplete portion of a connection request is fulfilled are described below. A determination may be made that the footprint coverage region of the first identified satellite is scheduled to exit the first area of Earth's surface before the first identified satellite completes fulfillment of the first connection request, e.g., see operation 224. This determination may be, at least in part, based on an estimated amount of time that the footprint coverage region of the satellite has left before exiting the first area of Earth's surface and an estimated amount of time that fulfillment of the first connection request has left. In some approaches, the estimated amount of time that fulfillment of the first connection request has left is based on a comparison of the remaining workload of the satellite and the current processing resources of the satellite. Techniques for performing these estimations and determinations that would become apparent to one of ordinary skill in the art after reading the descriptions herein may be used. In some approaches, this determination is made based on information in the temporal mapping table before the first connection request is assigned to a satellite that is to fulfill the first connection request. In some other approaches, this determination is made after the first connection request is assigned to a satellite that is to fulfill the first connection request and/or after fulfillment of the first connection request has begun.

A second satellite having a footprint coverage region that simultaneously matches the footprint coverage region of the first satellite within the first area of Earth's surface, e.g., for at least a predetermined amount of time (and preferably within a predetermined amount of time that the connection request is received so that fulfillment of the connection request is not delayed), and that has at least the predetermined number of the determined services loaded may be identified, e.g., see operation 226. For context, this second satellite is identified as a target for handing over a remaining unfulfilled portion of the first connection request to. Accordingly, method 200 may include causing the first connection request to be offloaded to the second identified satellite upon a determination that the footprint coverage region of the first identified satellite exits the first area of Earth's surface. In order to cause the second satellite to fulfill the remaining unfulfilled portion of the first connection request, the first connection request may be caused to be offloaded to the second identified satellite with an indication of the incomplete portions of the first connection request, e.g., see operation 228. In some approaches, the first connection request is additionally and/or alternatively handed over to the second satellite in response to a determination that the second identified satellite has relatively more of the determined services loaded than a remainder of the identified satellites that are also determined to have respective footprint coverage regions that are within the first area of Earth's surface upon the footprint coverage region of the first identified satellite being determined to exit the first area of Earth's surface. In another example, in response to a determination, subsequent to the first connection request being caused to be offloaded to the second identified satellite, that a third of the identified satellites has relatively more of the determined services loaded than the second identified satellite, causing the first connection request to be offloaded from the second identified satellite to the third identified satellite, e.g., see operation 230.

Several performance benefits are enabled as a result of deploying the techniques described herein for offloading connection requests from satellites determined to have relatively less services needed to fulfill a connection request loaded, to satellites having relatively more of the services loaded. For example, service and/or application loads are decreased as a result of utilizing the techniques described herein. This reduction in loading preserves processing resources that would otherwise be expended. These techniques furthermore dynamically sense for the need of services required to process edge data and processing of connection requests to optimize service instantiation. Furthermore, LEO satellite locations are preferably located based on collected input streams and autonomously provision an alternate processing location for relatively effective edge processing. The location, trajectory, events and other information is obtained from a plurality of satellites to ongoingly dynamically and proactively provision connection requests to determined satellites. Furthermore, these techniques leverage direct data connection to LEO satellite eNodeBs during special service provisioning for edge computing. This offers a relatively effective way to manage service orchestration in 5G and/or 6G networks.

Figure 3:
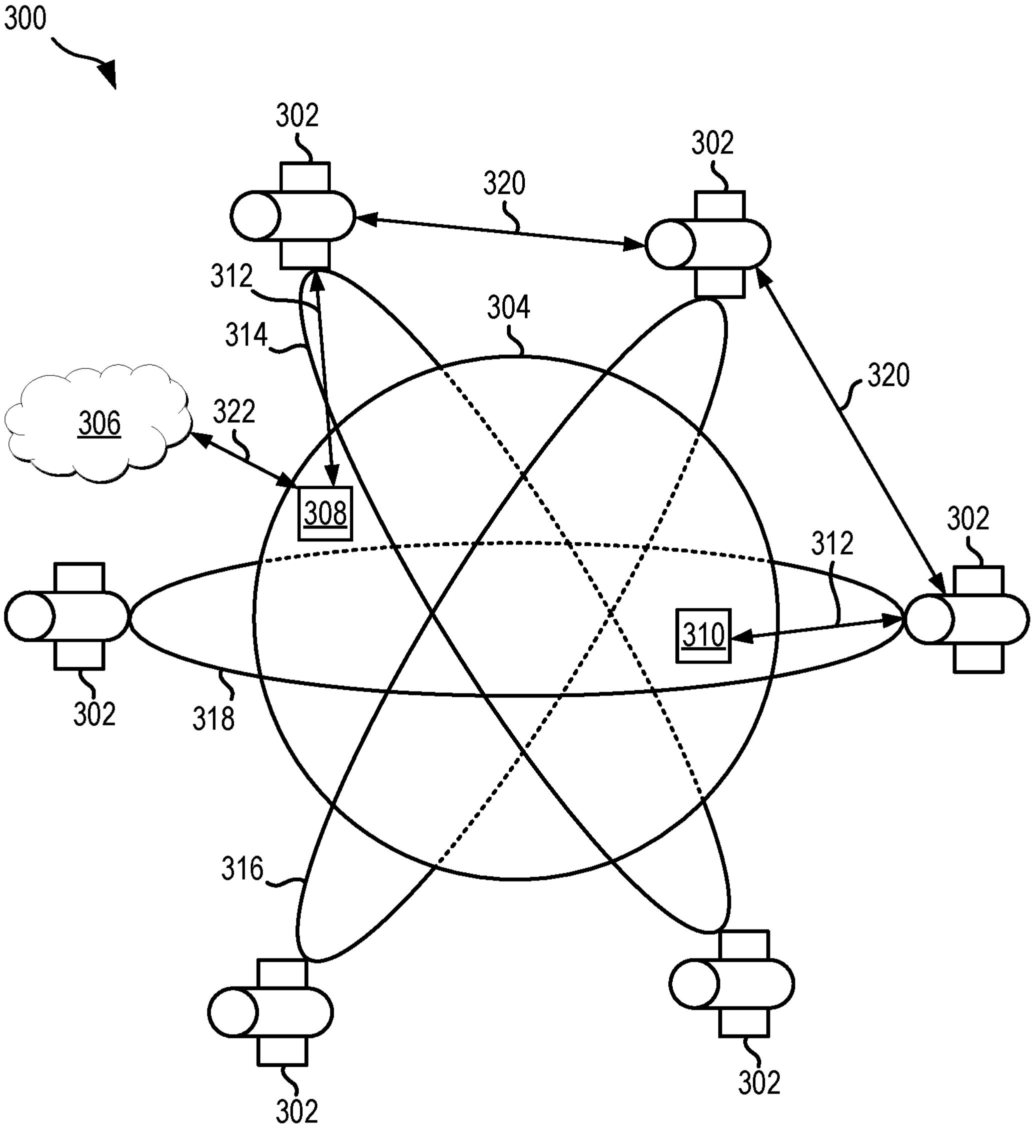
FIG. 3 is a depiction of a communication network, in accordance with one embodiment of the present invention.

FIG. 3 depicts a communication network 300, in accordance with one embodiment. As an option, the present communication network 300 may be implemented in conjunction with features from any other embodiment listed herein, such as those described with reference to the other FIGS. Of course, however, such communication network 300 and others presented herein may be used in various applications and/or in permutations which may or may not be specifically described in the illustrative embodiments listed herein. Further, the communication network 300 presented herein may be used in any desired environment.

The communication network 300 is based on communications that occur on Earth 304. The communication network 300 includes a plurality of satellites 302, which may be LEO satellites. Satellite information associated with the satellites 302 may be obtained and used to generate a temporal mapping table of orbital paths of the satellites with respect to Earth's surface. For example, at least one of the satellites may relay such information to other satellites via communication signals 320, and at least one of the satellites may optionally output the satellite information to a satellite control and management ground station 308 and/or a field component 310, e.g., see operations 312. At least some of the satellite information may additionally and/or alternatively be received and/or output to an internet and/or private network 306, e.g., see operation 322. Trajectories 314, 316, 318 of the satellites may be determined using the obtained satellite information.

Figure 4:
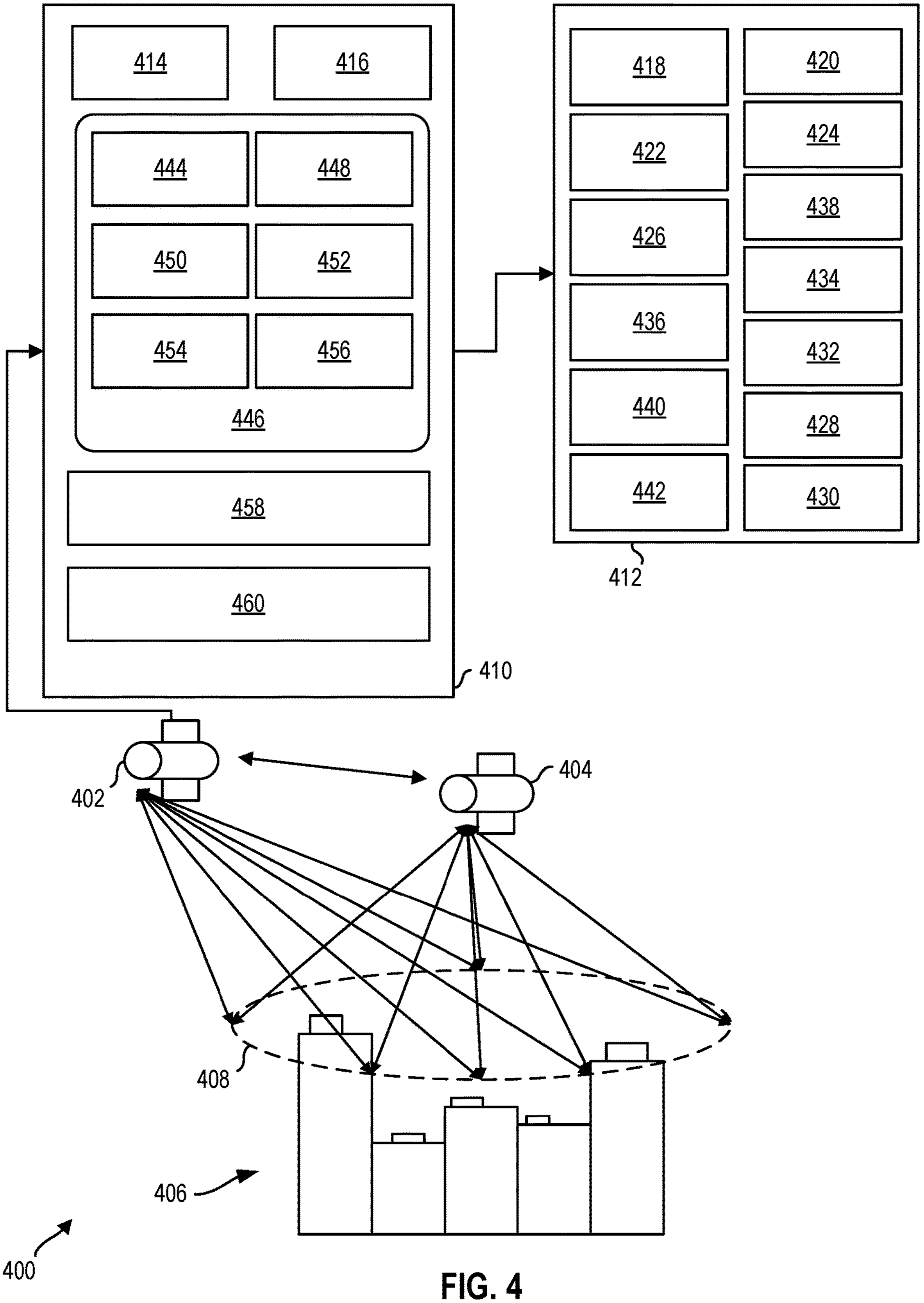
FIG. 4 is an environment, in accordance with one embodiment of the present invention.

FIG. 4 depicts an environment 400, in accordance with one embodiment. As an option, the present environment 400 may be implemented in conjunction with features from any other embodiment listed herein, such as those described with reference to the other FIGS. Of course, however, such environment 400 and others presented herein may be used in various applications and/or in permutations which may or may not be specifically described in the illustrative embodiments listed herein. Further, the environment 400 presented herein may be used in any desired environment.

The environment includes a plurality of satellites, e.g., see a first satellite 402 and a second satellite 404 that is identified by the first satellite 402. A footprint coverage region of the first satellite simultaneously matches a footprint coverage region of the second satellite within a first area of Earth's surface 406 that is located in a city, e.g., see matching footprint coverage regions 408.

In some approaches, various techniques described in method 200 may be performed by the first satellite 402. For example, in some approaches, satellite infrastructure APIs may be invoked to obtain physical parameters associated with one or more satellites. This preferably includes details such as a current altitude of a given one of the satellites, a footprint coverage region, a trajectory, orbital plane information, an average moving speed of the satellite eNodeBs, etc. Components of the first satellite, e.g., see edge to edge service management and orchestration layers 410 and 412 of the first satellite, that may be used to obtain this information may be of a type that would become apparent to one of ordinary skill in the art after reading the descriptions herein. For example, these components may include, e.g., a LEO movement gathering component 414, a drone signal management and communication component 416, etc.

The obtained information that may be passed to the service management and orchestration layer may, in some approaches, include information about footprint coverage regions of the satellites. This information is preferably used to identify whether the footprint coverage regions of the satellites match, e.g., overlap, for the first area of Earth's surface. In some approaches, a control plane of the management and orchestration layer of one or more identified satellites is enquired in order to obtain this information. For context, matching footprint coverage regions, e.g., overlapping footprint coverage regions, indicate there is more than one satellite covering the first area of Earth's surface. The information may be obtained by one or more components of the edge to edge service management and orchestration layers 410 and 412 of the first satellite, e.g., a service requirement gathering component 418 which may be configured to determine services needed to fulfill a connection request, a service locator component 420 that is configured to determine services currently loaded on a satellite, a DTCH service requirement decoder 422 that is configured to decode a connection request, a UUID mapper component 424 that is configured to generate a temporal mapping table from the information, a location to satellite mapping component 426 and a service to timeline mapping component 428 that are configured to update the generated temporal mapping table as a location of the satellites change over time, a mobility manager component 430 that is configured to generate location based information of an associated one of the satellites, a satellite footprint coverage region validity component 432 that is configured to determine and verify the footprint coverage region of an associated satellite, a service activation component 434 that is configured to maintain an updated list of active and/or previously used services on a satellite, etc.

In some approaches, in response to a determination that matching footprint coverage regions, e.g., overlapping trajectories of footprint coverage regions are detected to be occurring or estimated to occur, is detected, devices and the logical channels (DTCHs) that may be created from user devices within the first area of Earth's surface where the footprint coverage regions simultaneously match may be determined, e.g., to determine connection requests that are sent from the user device(s) to the first satellite. In some approaches, the devices and the logical channels (DTCHs) may be determined in order to determine services that are needed to fulfill such connection requests and/or additional services need to be provisioned by a satellite that is to fulfill the connection request.

Any upcoming new DTCH creation may be enquired for determining service capabilities requirements that are needed in case an application specific logical channel implementation is used. In some approaches, each application of a satellite is responsible for managing the DTCH connection request. Characteristics such as bandwidth, QCI and target service connection identifiers may be caused to be managed by applications of the satellites instead of mobile infrastructure. In one or more of such cases, a target service identifier may be needed for the endpoint application (on mobile device) to determine the service requirements from the management and orchestration plane (user plane of service orchestration) for the target. In some approaches, the identifier may include a service registry component 436 and/or a satellite enquiry and registry component 438 that are configured to register satellites via handshaking techniques in response to a determination that the satellites have matching footprint coverage regions. In some approaches, this registration may be, at least in part, established via network communication connections between the satellites that are established by a system connector and API interface component 440 and/or target UUID processor component 442.

In response to a determination that a service is received as part of a DTCH_CREATE response, the respective service activation is searched for and determined for a self-instance on the same home LEO. In other words, a determination is made, based on services currently loaded on the first satellite, as to whether the first satellite should fulfill a received connection request. In response to a determination that the services needed to fulfill the connection request are not present (unloaded/inactive), instead of provisioning the service(s) on the first satellite, the presence of the service loaded on another satellite that is covering same region is searched for, e.g., the second satellite. This determination is made possible, in some approaches, by referring to the temporal mapping table, e.g., satellites having the same footprint coverage region may be registered (with handshaking) with each other and the registration may be maintained in real time records in the table. In some approaches, the determination of which satellite to route the connection request to may be made by predetermined channel assignment logic 444 of a logical channel manager component 446 of the first satellite. In some approaches the logical channel manager component 446 of the first satellite may additionally and/or alternatively include a logical channel packet collection and extractor component 448 that is configured to extract satellite information from packets of other satellites, an EU device identifier and translator component 450 that is configured to cause a connection request to be dynamically handed over to another satellite, a device based personalized service requirement monitor component 452 that is configured to determine services needed to fulfill a connection request, on information tunneling manager component 454 that is configured to process satellite information obtained from other satellites, a device discovery service and channel level QCI component 456 that is configured to detect other satellites within a predetermined range of the first satellite, etc.

In response to a determination that the connection request should be offloaded to the second satellite, an identity of the second satellite is collected from the temporal mapping table, which may be a trace table, and a connection manager of the second satellite is instructed by the first satellite to accept the connection request. In contrast, in response to a determination that all the satellites serving the first area of Earth's surface do not have the needed services instantiated, e.g., the services needed for offloaded data processing at an edge location of the first user device (via deduplication, fingerprinting, etc.), a suitable satellite may be selected to fulfill the connection request, and the needed services are caused to be instantiated on the determined satellite. In some approaches, this satellite is the satellite that initially received the connection request, e.g., the first satellite. A DTCH connection may be transferred to the determined satellite that is caused to process a workload associated with the connection request.

In response to a determination that the connection request is fulfilled, e.g., the service requirements are over, and/or a determination that another satellite has each of the specialized edged services loaded, the service instance on the first satellite may be populated and then a connection handover may be made to the parent satellite, e.g., the satellite that initially received the connection request. In response to a determination that the parent satellite is not able to spawn the service due to one or more limitations, the edged offloading is stopped by instructing the mobile endpoint devices, e.g., the first user device, and the core-cloud service instance to begin processing the data.

The management and orchestration plane may additionally include a bearer channel infrastructure and E2E domain level orchestration layer 458 for communicating with other satellites, and an infrastructure management and transportation services component 460 for evaluating and sharing location information of the first satellite with other enquiring satellites.

Figure 5:
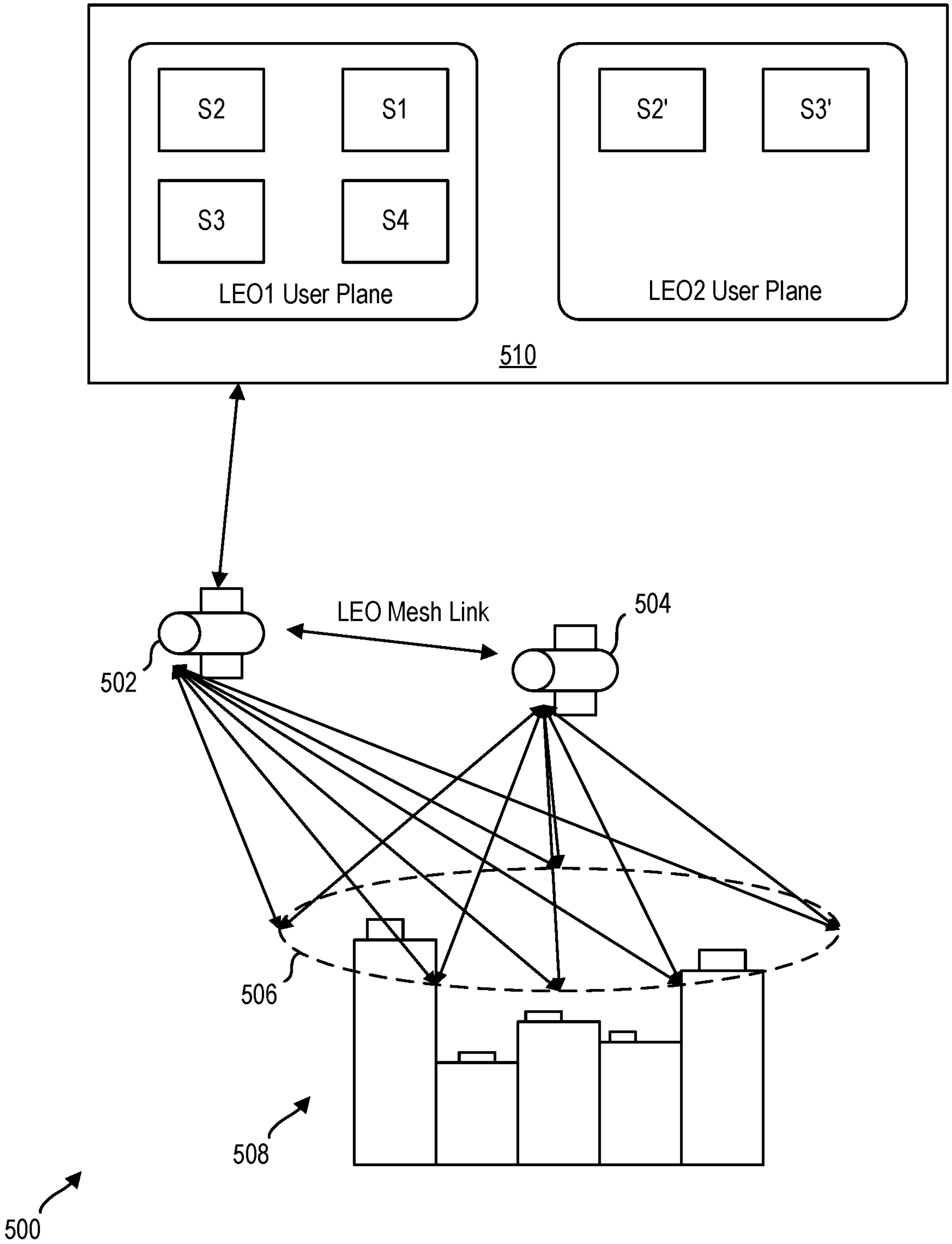
FIG. 5 is an environment, in accordance with one embodiment of the present invention.

FIG. 5 depicts an environment 500, in accordance with one embodiment. As an option, the present environment 500 may be implemented in conjunction with features from any other embodiment listed herein, such as those described with reference to the other FIGS. Of course, however, such environment 500 and others presented herein may be used in various applications and/or in permutations which may or may not be specifically described in the illustrative embodiments listed herein. Further, the environment 500 presented herein may be used in any desired environment.

Environment 500 includes a first satellite 502 and a second satellite 504 that may establish a mesh, e.g., see LEO Mesh Link, of satellites that have matching footprint coverage regions 506 within a first area 508 of Earth's surface.

A first connection request may be received on the first satellite and analyzed to determine services needed to fulfill the first connection request. Services currently loaded on the satellites may be determined. For example, a table of the service orchestration plane 510 details these determined services. More specifically, the first satellite has a first service S1, a second service S2, a third service S3 and a fourth service S4 currently loaded, e.g., see LEO1 User Plane. Meanwhile, the second satellite has a second service S2', and a third service S3' currently loaded, e.g., see LEO2 User Plane. These determinations are, in some approaches, made by a peer LEO loaned resources and spawned connection manager of the first satellite based on information determined from a LEO eNodeB connection processor if the second satellite.

Assuming that a predetermined number of the service is three, a determination is made that the first satellite has at least the predetermined number of the determined services loaded, and in response thereto, the first satellite is caused to fulfill the connection request.

Figure 6:
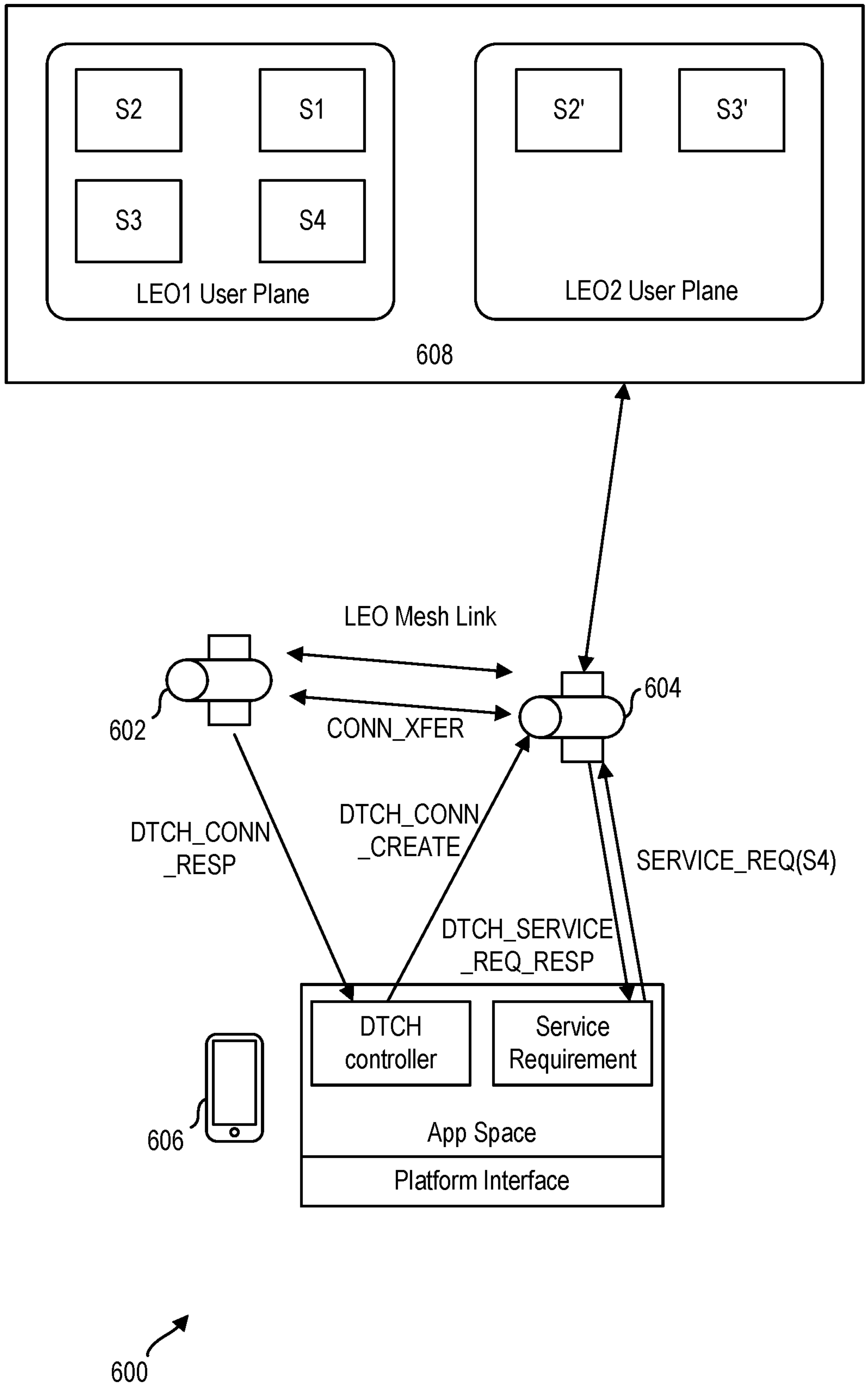
FIG. 6 is an environment, in accordance with one embodiment of the present invention.

FIG. 6 depicts an environment 600, in accordance with one embodiment. As an option, the present environment 600 may be implemented in conjunction with features from any other embodiment listed herein, such as those described with reference to the other FIGS. Of course, however, such environment 600 and others presented herein may be used in various applications and/or in permutations which may or may not be specifically described in the illustrative embodiments listed herein. Further, the environment 600 presented herein may be used in any desired environment.

Environment 600 includes a first satellite 602 and a second satellite 604 that may establish a mesh, e.g., see LEO Mesh Link. A first connection request, e.g., see DTCH_CONN_CREATE, may be received on the second satellite from a first user device 606. The first user device includes a controller, e.g., see DTCH controller, and a service requirement specifier component of an application space of a platform interface. The connection response is analyzed to determine services needed to fulfill the first connection request. In some approaches, the connection request specifies these services, e.g., see SERVICE_REQ (S4). Services currently loaded on the satellites may be determined. For example, a table of the service orchestration plane 608 details these determined services. More specifically, the first satellite has a first service S1, a second service S2, a third service S3 and a fourth service S4 currently loaded, e.g., see LEO1 User Plane. Meanwhile, the second satellite has a second service S2', and a third service S3' currently loaded, e.g., see LEO2 User Plane.

Assuming that a predetermined number of the service is three, a determination is made that the second satellite does not have at least the predetermined number of the determined services loaded, and in response thereto, the first satellite is considered. In response to a determination that the first satellite has at least the predetermined number of the determined services loaded, the connection request is offloaded from the second satellite to the first satellite and the first satellite, e.g., see CONN_XFER, is caused to fulfill the connection request, e.g., see connection DTCH_CONN_RESP established to fulfill the connection request. In some approaches, in response to a determination that the first satellite has successfully fulfilled the first connection request, the parent satellite, e.g., the second satellite that received the first connection request, returns a confrontation to the first user device, e.g., see DTCH_SERVICE_REQ_RESP.

Software for performing the methodology of FIG. 2A may be deployed to a computer that will perform the method via any known technique. An exemplary process for such deployment is presented immediately below.

Figure 7:
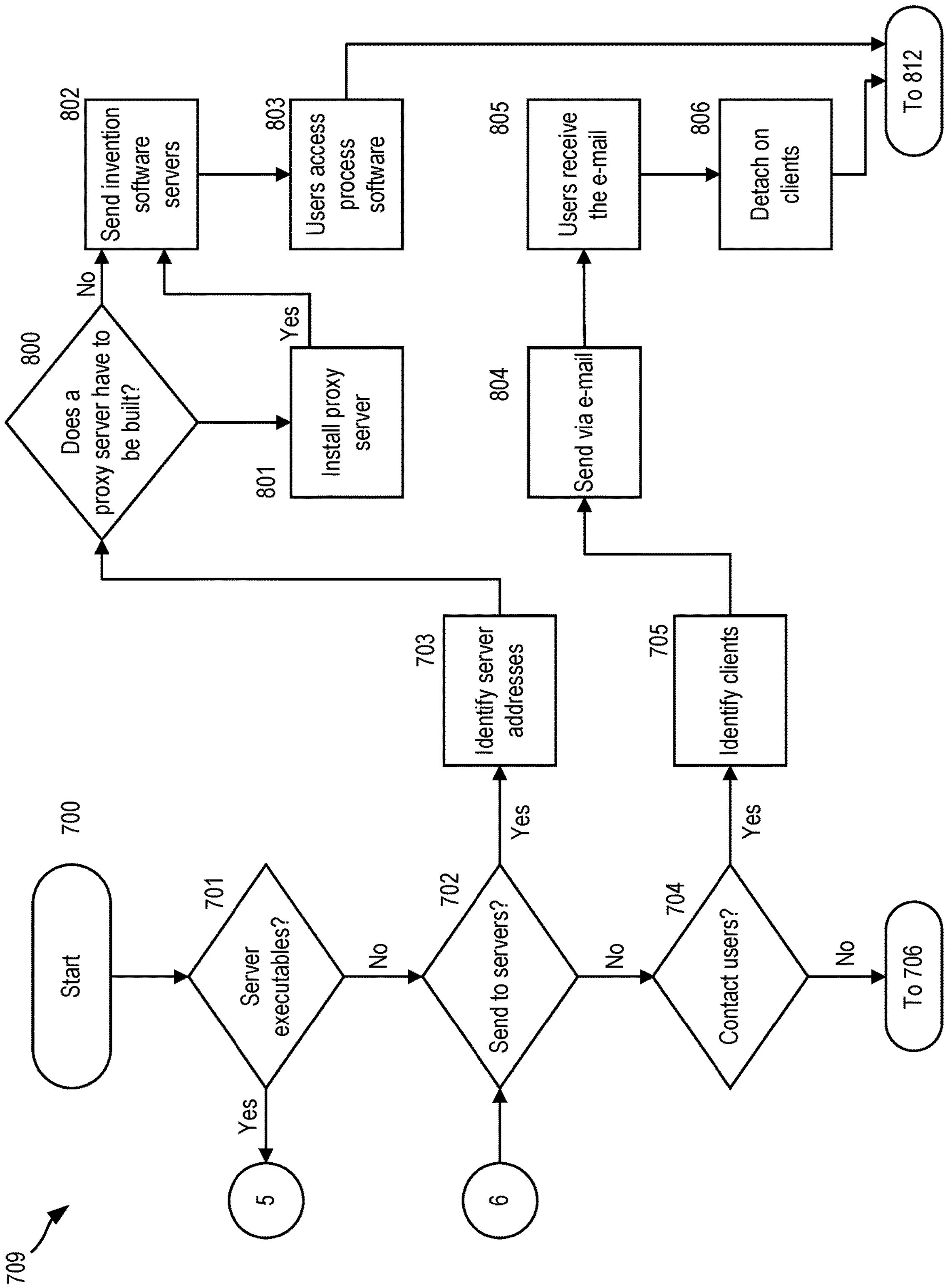
FIG. 7 is a flowchart of a method, in accordance with one embodiment of the present invention.
Figure 7:
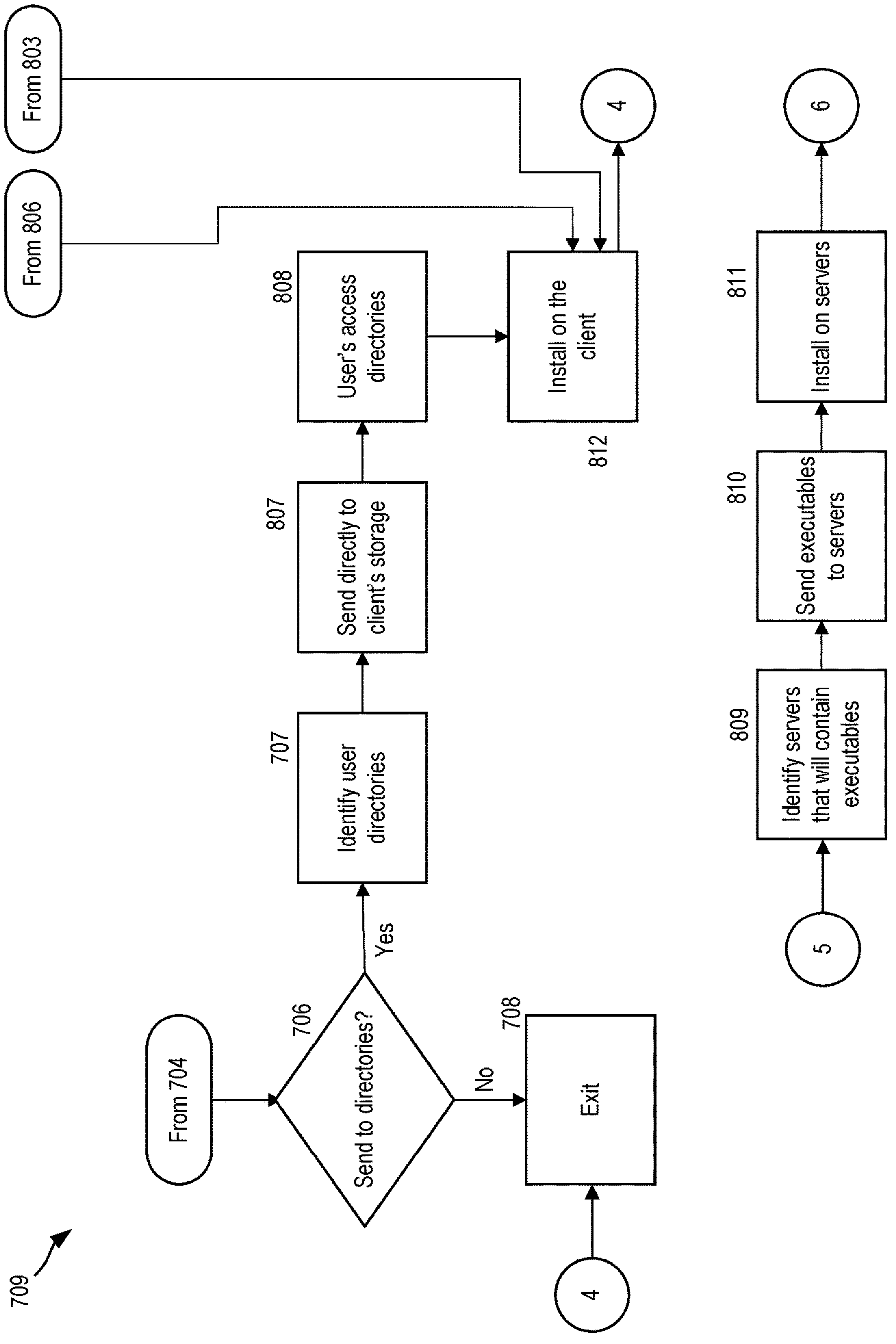

Now referring to FIG. 7, a flowchart of a method 709 is shown according to one embodiment. The method 709 may be performed in accordance with the present invention in any of the environments depicted in FIGS. 1-7, among others, in various embodiments. Of course, more or fewer operations than those specifically described in FIG. 7 may be included in method 709, as would be understood by one of skill in the art upon reading the present descriptions.

Each of the steps of the method 709 may be performed by any suitable component of the operating environment. For example, in various embodiments, the method 709 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 709. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for offloading connection requests from satellites determined to have relatively less services needed to fulfill the connection requests loaded, to satellites having relatively more of the services loaded may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 700 begins the deployment of the process software. An initial step is to determine if there are any programs that will reside on a server or servers when the process software is executed (701). If this is the case, then the servers that will contain the executables are identified (809). The process software for the server or servers is transferred directly to the servers' storage via FTP or some other protocol or by copying though the use of a shared file system (810). The process software is then installed on the servers (811).

Next, a determination is made on whether the process software is to be deployed by having users access the process software on a server or servers (702). If the users are to access the process software on servers, then the server addresses that will store the process software are identified (703).

A determination is made if a proxy server is to be built (800) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (801). The process software is sent to the (one or more) servers either via a protocol such as FTP, or it is copied directly from the source files to the server files via file sharing (802). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (803). Another embodiment is to have the servers automatically copy the process software to each client and then run the installation program for the process software at each client computer. The user executes the program that installs the process software on his client computer (812) and then exits the process (708).

In step 704 a determination is made whether the process software is to be deployed by sending the process software to users via e-mail. The set of users where the process software will be deployed are identified together with the addresses of the user client computers (705). The process software is sent via e-mail (804) to each of the users' client computers. The users then receive the e-mail (805) and then detach the process software from the e-mail to a directory on their client computers (806). The user executes the program that installs the process software on his client computer (812) and then exits the process (708).

Lastly, a determination is made on whether the process software will be sent directly to user directories on their client computers (706). If so, the user directories are identified (707). The process software is transferred directly to the user's client computer directory (807). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (808). The user executes the program that installs the process software on his client computer (812) and then exits the process (708).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining satellite information associated with a plurality of satellites;
generating, based on the obtained satellite information, a temporal mapping table of orbital paths of the plurality of satellites with respect to Earth's surface, wherein generating the temporal mapping table comprises appending footprint coverage regions of the plurality of satellites with Earth's surface in the temporal mapping table;
receiving, on a first satellite of the plurality of satellites, a first connection request that is a direct channel (DICH) request from a first 5G/6G capable edge device on Earth's surface;
analyzing the first connection request to determine services needed to fulfill the first connection request;
in response to a determination that the first satellite does not have at least a predetermined number of the determined services loaded, performing a predetermined offload process including:
identifying at least one satellite based on the temporal mapping table, of the plurality of satellites, having a footprint coverage region that simultaneously matches a footprint coverage region of the first satellite within a first area of Earth's surface;
determining whether a first identified satellite of the identified satellites, of the plurality of satellites, has at least the predetermined number of the determined services loaded; and
in response to a determination that the first identified satellite has at least the predetermined number of the determined services loaded, causing the first connection request to be offloaded from the first satellite to the first identified satellite.

2. The computer-implemented method of claim 1, wherein the first satellite is a low Earth orbit (LEO) satellite.

3. The computer-implemented method of claim 1,
wherein the generated temporal mapping table is used to identify that the footprint coverage region of the first identified satellite simultaneously matches the footprint coverage region of the first satellite within the first area of the Earth's surface, and comprising:
in response to identifying that the footprint coverage region of the first identified satellite simultaneously matches the footprint coverage region of the first satellite within the first area of Earth's surface, causing the first identified satellite to be registered with the first satellite,
wherein the appending is performed by injecting a ground surface coordinate map with satellite geographical location information associated with the plurality of satellites.

4. The computer-implemented method of claim 3, wherein determining whether the first identified satellite has at least the predetermined number of the determined services loaded includes:
identifying, from a current application workload of the first identified satellite, applications that the first identified satellite currently has loaded and/or is scheduled to have loaded while the footprint coverage region of the first identified satellite is within the first area of the Earth's surface,
determining whether the identified applications perform at least one of the determined services, and
in response to a determination that a total number of identified applications that perform at least one of the determined services is greater than or equal to the predetermined number, determining that the first identified satellite has at least the predetermined number of the determined services loaded.

5. The computer-implemented method of claim 1, comprising:
causing the first connection request to be offloaded to the first identified satellite;
determining that the footprint coverage region of the first identified satellite is scheduled to exit the first area of the Earth's surface before the first identified satellite completes fulfillment of the first connection request;
identifying a second satellite having a footprint coverage region that simultaneously matches the footprint coverage region of the first satellite within the first area of Earth's surface and that has at least the predetermined number of the determined services loaded; and
causing the first connection request to be offloaded to the second identified satellite upon the footprint coverage region of the first identified satellite exiting the first area of Earth's surface.

6. The computer-implemented method of claim 1, comprising:
in response to a determination that none of the identified satellite have at least the predetermined number of the determined services loaded, fulfilling, by the first satellite, the first connection request, wherein fulfilling the first connection request includes loading the services determined to not be loaded on the first satellite.

7. The computer-implemented method of claim 6, wherein the determined services for fulfilling the first connection request include resources for offloading data from an edge device from which the first connection request is received.

8. The computer-implemented method of claim 7, wherein fulfillment of the first connection request includes generating a logical channel between the first satellite and the edge device, wherein the logical channel has a dedicated bandwidth that is used by applications associated with the determined services for receiving the data from the edge device during the offloading.

9. The computer-implemented method of claim 1, comprising:
causing the first connection request to be offloaded to the first identified satellite in response to a determination that the first identified satellite has relatively more of the determined services loaded than a remainder of the identified satellites; and
in response to a determination, subsequent to the first connection request being caused to be offloaded to the first identified satellite, that a second of the identified satellites has relatively more of the determined services loaded than the first identified satellite, causing the first connection request to be offloaded from the first identified satellite to the second identified satellite.

10. A computer program product, the computer program product comprising a computer readable storage medium having program instructions embodied therewith, the program instructions readable and/or executable by a processing circuit of a first satellite to cause the processing circuit of the first satellite to:

obtain satellite information associated with a plurality of satellites;

generate, based on the obtained satellite information, a temporal mapping table of orbital paths of the plurality of satellites with respect to the Earth's surface, wherein generating the temporal mapping table comprises appending footprint coverage regions of the plurality of satellites with the Earth's surface in the temporal mapping table;

receive, on a first satellite of the plurality of satellites, a first connection request that is a direct channel (DTCH) request from a first 5G/6G capable edge device on Earth's surface;

in response to a determination that the first satellite does not have at least a predetermined number of the determined services loaded, performing a predetermined offload process including:

identifying at least one satellite based on the temporal mapping table, of the plurality of satellites, having a footprint coverage region that simultaneously matches a footprint coverage region of the first satellite within a first area of the Earth's surface;

determining whether a first identified satellite of the identified satellites, of the plurality of satellites, has at least the predetermined number of the determined services loaded; and in response to a determination that the first identified satellite has at least the predetermined number of the determined services loaded, causing the first connection request to be offloaded from the first satellite to the first identified satellite.

11. The computer program product of claim 10, wherein the first satellite is a low Earth orbit (LEO) satellite.

12. The computer program product of claim 10, wherein the generated temporal mapping table is used to identify that the footprint coverage region of the first identified satellite simultaneously matches the footprint coverage region of the first satellite within the first area of the Earth's surface, and comprising:

in response to identifying that the footprint coverage region of the first identified satellite simultaneously matches the footprint coverage region of the first satellite within the first area of Earth's surface, causing the first identified satellite to be registered with the first satellite, wherein the appending is performed by injecting a ground surface coordinate map with satellite geographical location information associated with the plurality of satellites.

13. The computer program product of claim 12, wherein determining whether the first identified satellite has at least the predetermined number of the determined services loaded includes:

identifying, from a current application workload of the first identified satellite, applications that the first identified satellite currently has loaded and/or is scheduled to have loaded while the footprint coverage region of the first identified satellite is within the first area of the Earth's surface, determining whether the identified applications perform at least one of the determined services, and in response to a determination that a total number of identified applications that perform at least one of the determined services is greater than or equal to the predetermined number, determining that the first identified satellite has at least the predetermined number of the determined services loaded.

14. The computer program product of claim 10, the program instructions readable and/or executable by the processing circuit of the first satellite to cause the processing circuit of the first satellite to:

cause the first connection request to be offloaded to the first identified satellite;

determine that the footprint coverage region of the first identified satellite is scheduled to exit the first area of the Earth's surface before the first identified satellite completes fulfillment of the first connection request;

identify a second satellite having a footprint coverage region that simultaneously matches the footprint coverage region of the first satellite within the first area of Earth's surface and that has at least the predetermined number of the determined services loaded; and cause the first connection request to be offloaded to the second identified satellite upon the footprint coverage region of the first identified satellite exiting the first area of Earth's surface.

15. The computer program product of claim 10, the program instructions readable and/or executable by the processing circuit of the first satellite to cause the processing circuit of the first satellite to:

in response to a determination that none of the identified satellite have at least the predetermined number of the determined services loaded, fulfill, by the first satellite, the first connection request, wherein fulfilling the first connection request includes loading the services determined to not be loaded on the first satellite.

16. The computer program product of claim 15, wherein the determined services for fulfilling the first connection request include resources for offloading data from an edge device from which the first connection request is received.

17. The computer program product of claim 16, wherein fulfillment of the first connection request includes generating a logical channel between the first satellite and the edge device, wherein the logical channel has a dedicated bandwidth that is used by applications associated with the determined services for receiving the data from the edge device during the offloading.

18. The computer program product of claim 10, the program instructions readable and/or executable by the processing circuit of the first satellite to cause the processing circuit of the first satellite to:

cause the first connection request to be offloaded to the first identified satellite in response to a determination that the first identified satellite has relatively more of the determined services loaded than a remainder of the identified satellites; and in response to a determination, subsequent to the first connection request being caused to be offloaded to the first identified satellite, that a second of the identified satellites has relatively more of the determined services loaded than the first identified satellite, cause the first connection request to be offloaded from the first identified satellite to the second identified satellite.

19. A system, comprising:

a processor of a first satellite; and logic integrated with the processor, executable by the processor, or integrated with and executable by the processor, the logic being configured to:

obtain satellite information associated with a plurality of satellites;

generate, based on the obtained satellite information, a temporal mapping table of orbital paths of the plurality of satellites with respect to the Earth's surface, wherein generating the temporal mapping table comprises appending footprint coverage regions of the plurality of satellites with the Earth's surface in the temporal mapping table;

receive, on a first satellite of the plurality of satellites, a first connection request that is a direct channel (DTCH) request from a first 5G/6G capable edge device on Earth's surface;

in response to a determination that the first satellite does not have at least a predetermined number of the determined services loaded, performing a predetermined offload process including:

identifying at least one satellite based on the temporal mapping table, of the plurality of satellites, having a footprint coverage region that simultaneously matches a footprint coverage region of the first satellite within a first area of the Earth's surface;

determining whether a first identified satellite of the identified satellites, of the plurality of satellites, has at least the predetermined number of the determined services loaded; and in response to a determination that the first identified satellite has at least the predetermined number of the determined services loaded, causing the first connection request to be offloaded from the first satellite to the first identified satellite.

20. The system of claim 19, wherein the first satellite is a low Earth orbit (LEO) satellite.

* * * * *